(12) United States Patent
Hashimoto

(10) Patent No.: US 7,619,713 B2
(45) Date of Patent: Nov. 17, 2009

(54) LIQUID CRYSTAL OPTICAL ELEMENT AND METHOD FOR MANUFACTURING THEREOF

(75) Inventor: Nobuyuki Hashimoto, Iruma (JP)

(73) Assignee: Citizen Holdings Co., Inc., Tokyo (JP)

( * ) Notice: Subject to any disclaimer, the term of this patent is extended or adjusted under 35 U.S.C. 154(b) by 352 days.

(21) Appl. No.: 11/791,124

(22) PCT Filed: Nov. 21, 2005

(86) PCT No.: PCT/JP2005/021745
§ 371 (c)(1), (2), (4) Date: May 21, 2007

(87) PCT Pub. No.: WO2006/054803
PCT Pub. Date: May 26, 2006

(65) Prior Publication Data
US 2008/0002139 A1    Jan. 3, 2008

(30) Foreign Application Priority Data
Nov. 22, 2004  (JP) ............................. 2004-337542

(51) Int. Cl.
*G02F 1/13* (2006.01)
(52) U.S. Cl. .................. 349/200; 349/147; 359/254
(58) Field of Classification Search ............... 349/142, 349/147, 148, 193, 200; 359/244, 245, 253, 359/254, 255
See application file for complete search history.

(56) References Cited

U.S. PATENT DOCUMENTS 6,191,881 B1 * 2/2001 Tajima ................. 359/254
6,778,246 B2 * 8/2004 Sun et al. .............. 349/146
2001/0055145 A1  12/2001 Hamada

FOREIGN PATENT DOCUMENTS

| JP | 61-140920 | 6/1986 |
|---|---|---|
| JP | 62-36632 A | 2/1987 |
| JP | 62-56918 A | 3/1987 |
| JP | 5-100201 | 4/1993 |
| JP | 2651148 B | 9/1997 |
| JP | 10-239676 | 9/1998 |
| JP | 11-352453 | 12/1999 |
| JP | 3047082 B | 5/2000 |
| JP | 2001-194690 | 7/2001 |

* cited by examiner

*Primary Examiner*—Hemang Sanghavi
(74) *Attorney, Agent, or Firm*—Finnegan, Henderson, Farabow, Garrett & Dunner, L.L.P.

(57) ABSTRACT

The present invention is directed to the provision of a liquid crystal optical element that is inexpensive, has an ideal refractive index profile, and functions as a high-performance gradient-index lens. The liquid crystal optical element (100) includes a first planar substrate (101), a second planar substrate (105), a liquid crystal (106) provided between the first and second planar substrates, an electrode pattern (200) formed on one of the first and second planar substrates and having a plurality of regions (201 to 215) each for varying an effective refractive index for a light beam by a respectively different degree, and a counter electrode (108), formed on the other one of the first and second planar substrates, for applying voltage with respect to the electrode pattern, wherein the refractive index for a light beam varies with the square of the distance from the center of the liquid crystal optical element along a radial direction across the liquid crystal optical element when the voltage is applied between the electrode pattern and the counter electrode.

13 Claims, 18 Drawing Sheets

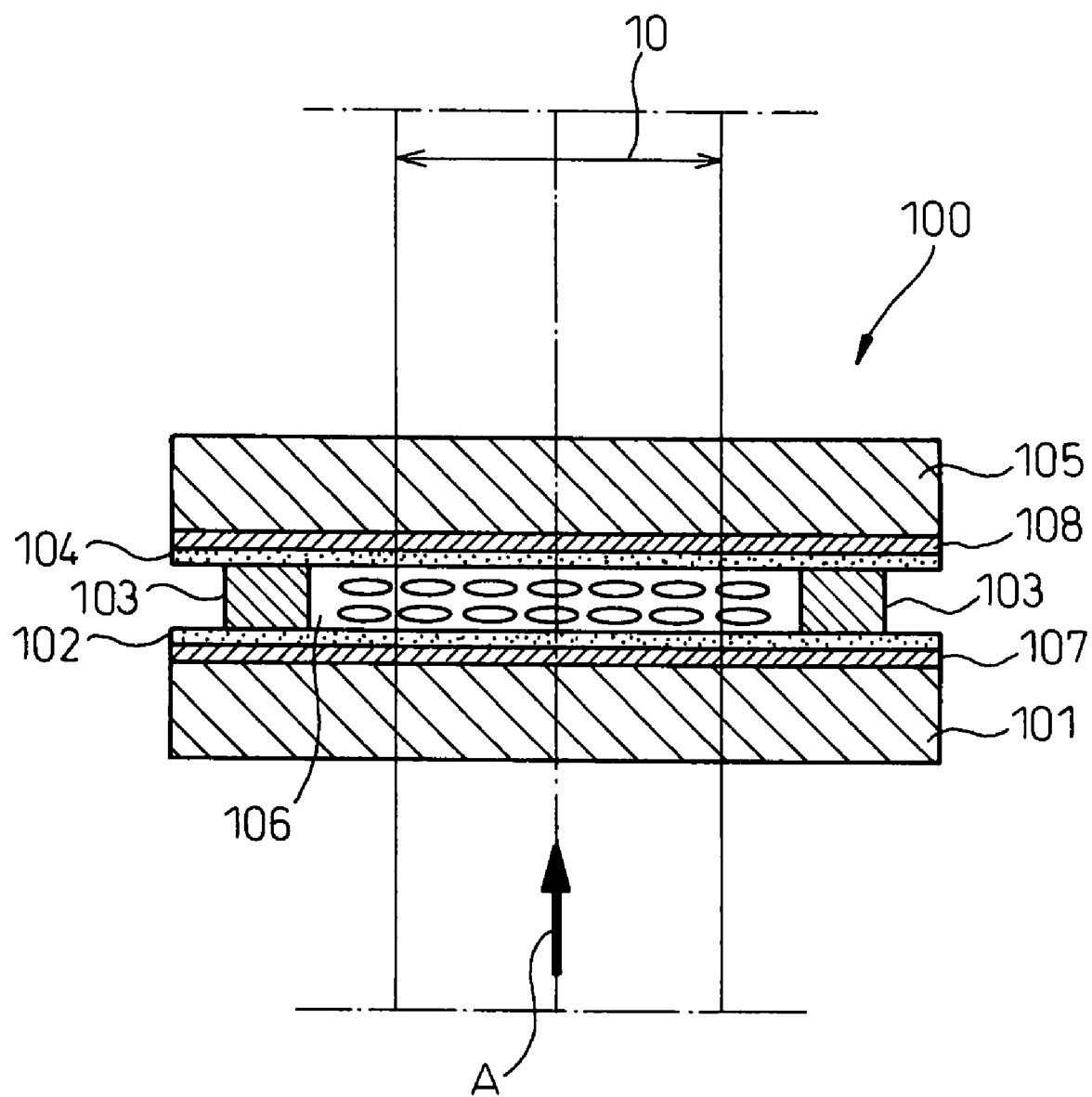

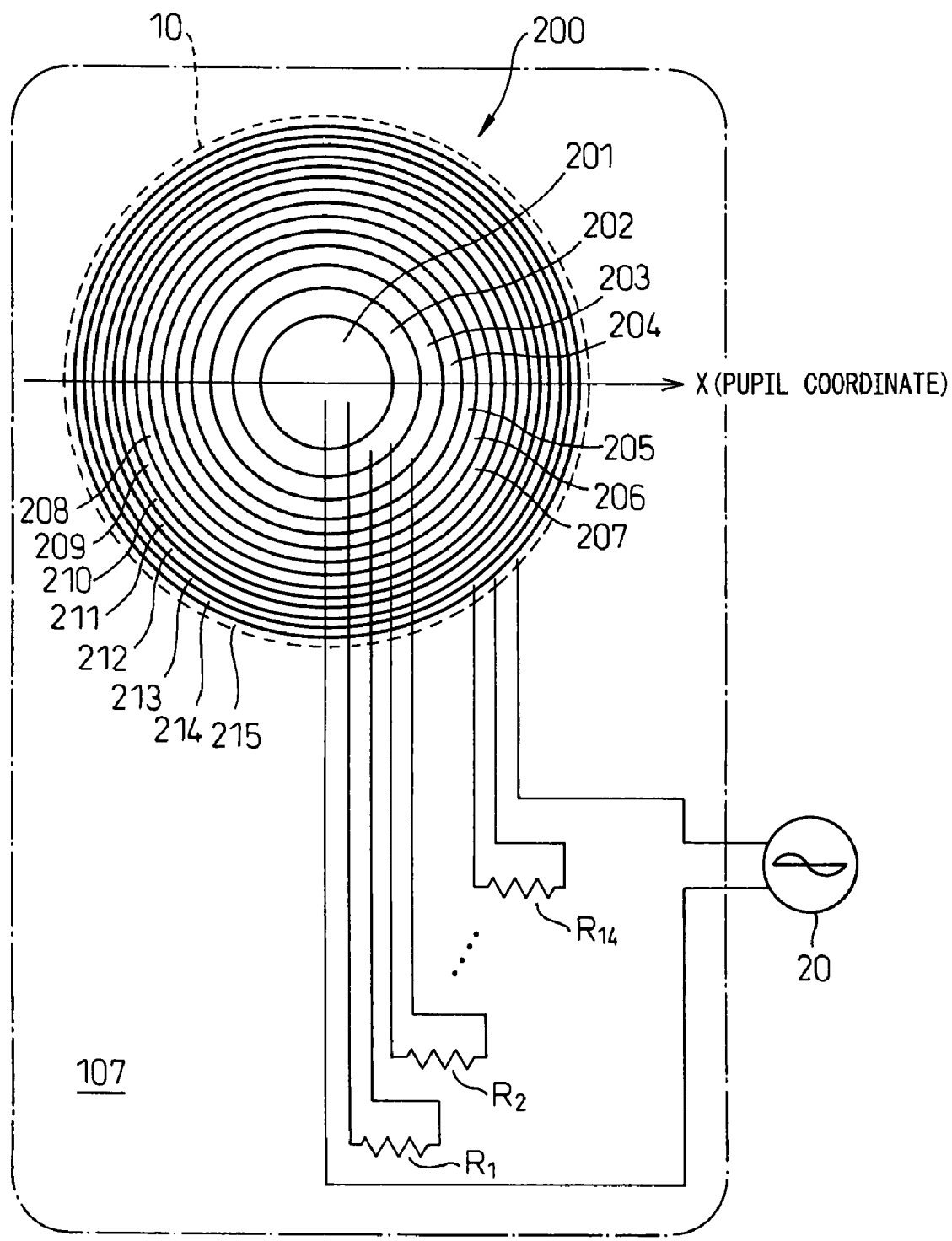

Fig.6

| RING NUMBER | RING WIDTH (mm) | INNER RADIUS (mm) | OUTER RADIUS (mm) | GAP CENTER RADIUS (mm) | GAP WIDTH (mm) |
|---|---|---|---|---|---|
| 201 | 0.314 | 0 | 0.314 | 0.3155 | 0.003 |
| 202 | 0.127 | 0.317 | 0.444 | 0.4455 | 0.003 |
| 203 | 0.097 | 0.447 | 0.544 | 0.5465 | 0.003 |
| 204 | 0.081 | 0.547 | 0.629 | 0.635 | 0.003 |
| 205 | 0.071 | 0.632 | 0.703 | 0.7045 | 0.003 |
| 206 | 0.064 | 0.706 | 0.77 | 0.7725 | 0.003 |
| 207 | 0.059 | 0.773 | 0.832 | 0.8335 | 0.003 |
| 208 | 0.055 | 0.835 | 0.889 | 0.8915 | 0.003 |
| 209 | 0.051 | 0.892 | 0.944 | 0.9455 | 0.003 |
| 210 | 0.048 | 0.947 | 0.995 | 0.9965 | 0.003 |
| 211 | 0.046 | 0.998 | 1.043 | 1.0455 | 0.003 |
| 212 | 0.043 | 1.046 | 1.09 | 1.0915 | 0.003 |
| 213 | 0.042 | 1.093 | 1.134 | 1.1365 | 0.003 |
| 214 | 0.04 | 1.137 | 1.177 | 1.1795 | 0.003 |
| 215 | 0.038 | 1.18 | 1.219 | 1.2205 | |

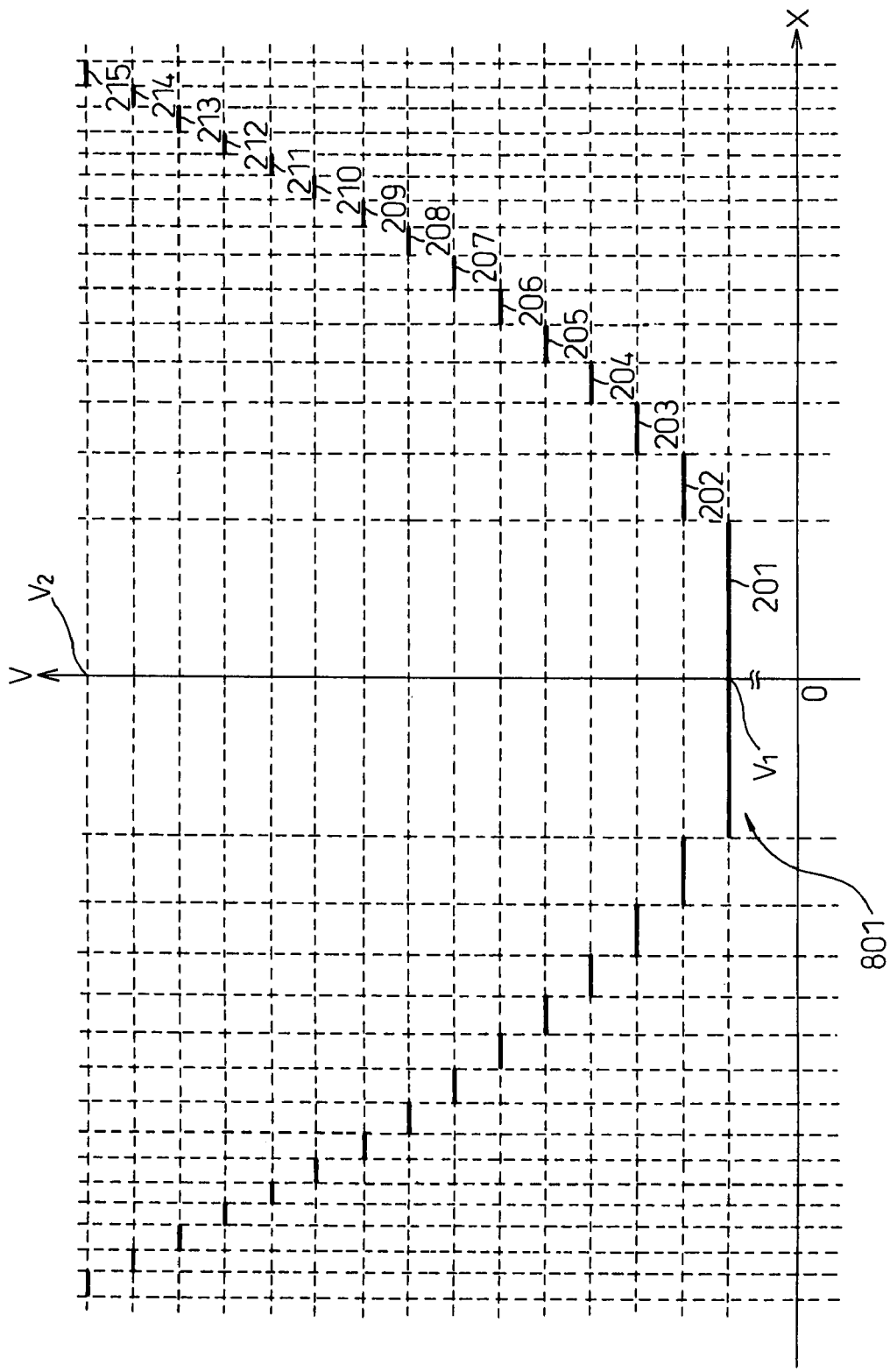

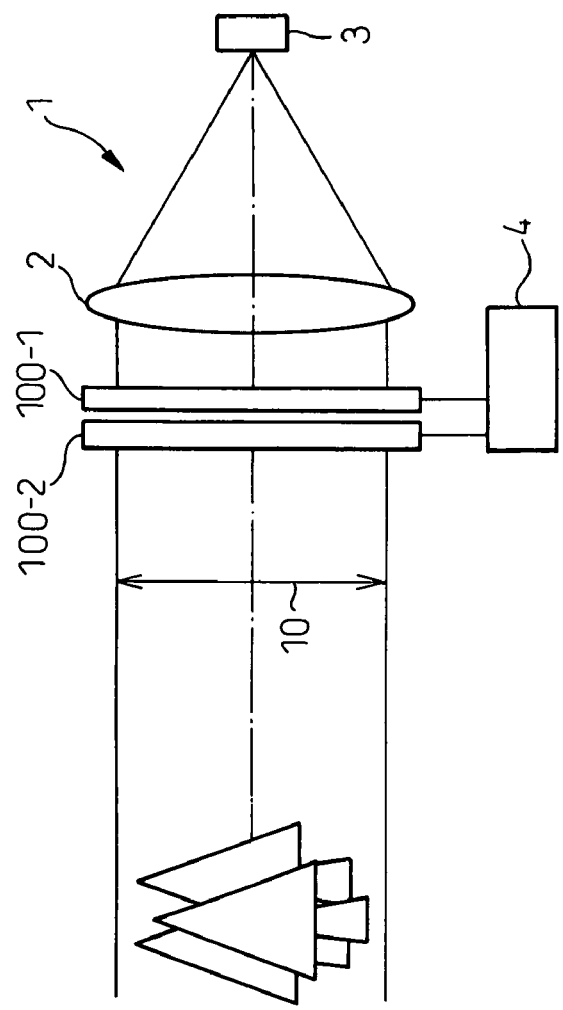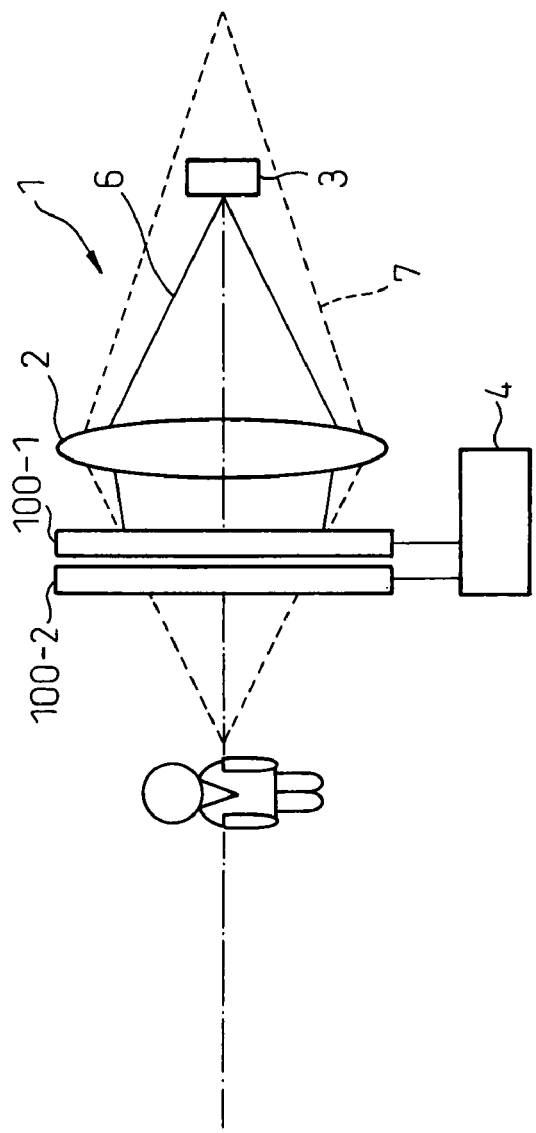

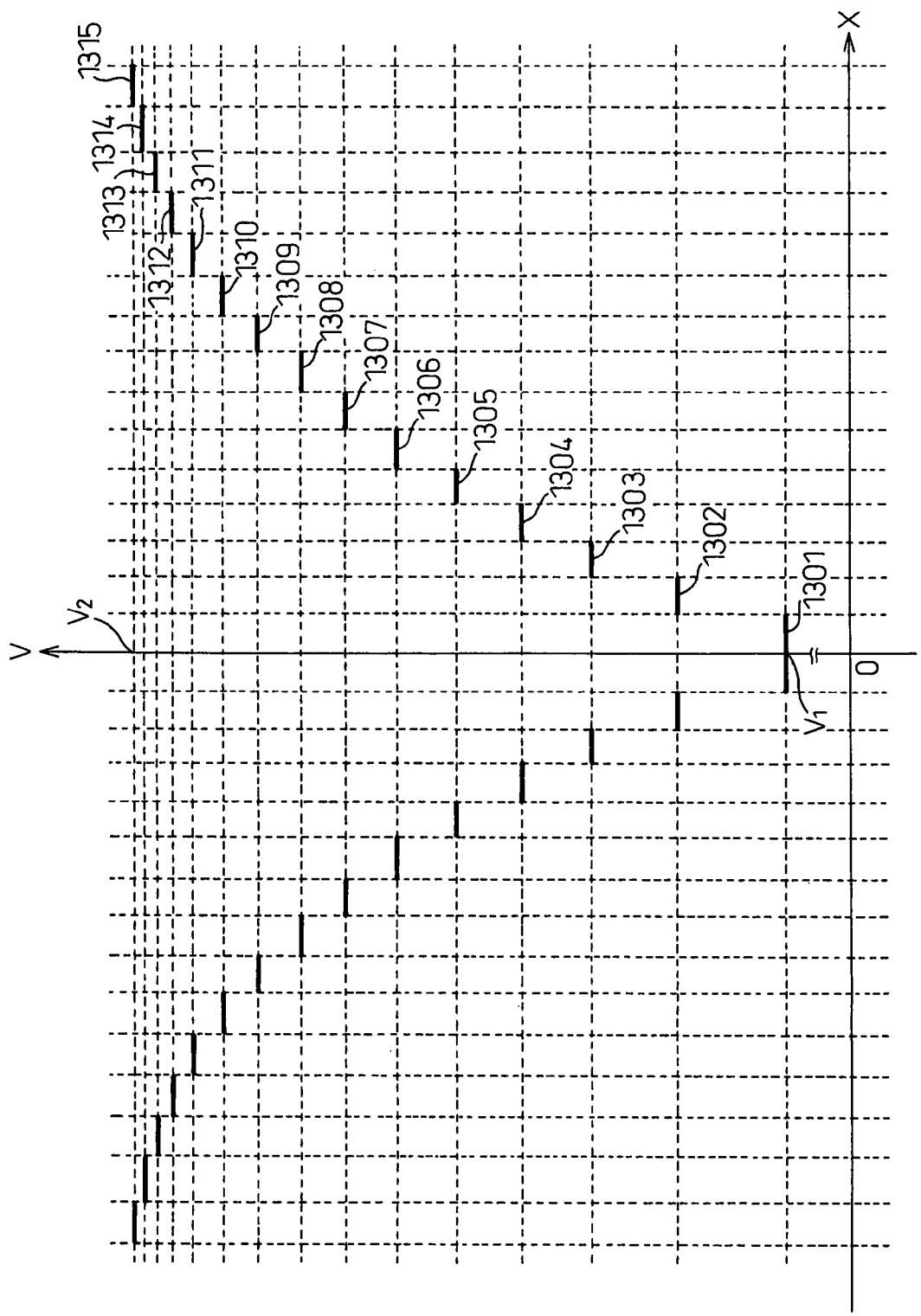

US 7,619,713 B2

LIQUID CRYSTAL OPTICAL ELEMENT AND METHOD FOR MANUFACTURING THEREOF

FIELD OF THE INVENTION

The present invention relates to a liquid crystal optical element that can be used as a gradient-index lens for incident light, and a method for manufacturing thereof. More particularly, the invention relates to a liquid crystal optical element that can be used as a gradient-index lens for varying focal length in a variable focus optical mechanism, and a method for manufacturing thereof.

BACKGROUND OF THE INVENTION

There is an increasing demand for so-called liquid crystal lenses whose focal length can be varied in accordance with voltage applied to the liquid crystal element. In an autofocus mechanism or optical variable magnification mechanism used in a conventional digital camera or the like, the provision of a mechanical system for moving a lens or lenses is essential, which not only requires space for mounting, but also increases the cost. On the other hand, in the case of liquid crystal lenses, since no moving parts are required, a space-saving, low-cost autofocus mechanism or optical variable magnification mechanism can be achieved.

For example, a liquid crystal lens is known, which is formed by placing a liquid crystal between two glass substrates and cutting out one of the glass substrates into the shape of a lens, and in which voltage is applied to the liquid crystal thereby causing the effective refractive index of the liquid crystal to change, thus changing the focal length by utilizing the refractive index difference between the glass and the liquid crystal (for example, refer to patent document 1). The liquid crystal lens thus formed by cutting out glass into the shape of a lens can be constructed to have an ideal refractive index profile.

However, cutting out a glass substrate into the shape of a lens is a time-consuming and cost-intensive job, and it has not been possible to provide an inexpensive, high-performance liquid crystal lens that is capable of varying focus length and is relatively free from aberrations.

Further, an autofocus alignment lens system is described in which the focal length is finely varied using a variable focal length liquid crystal lens (for example, refer to patent document 2).

However, the specific structure of the variable focal length liquid crystal lens has not been shown in the prior art. Furthermore, in the prior art, the variable focal length liquid crystal lens has only been used for fine adjustment of the focal length, and the system has been equipped with a separate focusing lens for varying the focal length and a moving mechanism for the same.

There is also a known liquid crystal panel, which is formed by placing a liquid crystal between two transparent substrates with an electrode pattern of a plurality of concentric circles and a counter electrode interposed therebetween, and in which voltage is applied to the electrode pattern to form a Fresnel zone plate utilizing the liquid crystal, and the pattern of the Fresnel zone plate is varied to perform spatial frequency modulation thereby causing the focal length to change (for example, refer to patent document 3).

However, to vary the focal length, the electrode pattern itself has had to be changed, and this has required a special technique for changing the electrode pattern in accordance with the situation. That is, the liquid crystal panel described in patent document 3 was intended for a liquid crystal optical element that functions as a gradient-index lens for varying the focal length by using a fixed electrode pattern.

It is also known to construct a focusing system using a liquid crystal in which a liquid crystal is placed between two parallel planar substrates by interposing therebetween a plurality of electrodes arranged in equally spaced concentric circles and a counter electrode, with a resistor interposed between each electrode, and in which prescribed voltage is applied to each particular electrode by resistive dividing, thereby causing the effective refractive index of the liquid crystal between the electrode and the counter electrode to change and thus causing the focal length to change (for example, refer to patent document 4).

FIG. 17(a) shows an electrode pattern 12 such as described in patent document 4. The electrode pattern 12 has four electrodes 12-1 to 12-4 arranged in equally spaced concentric circles. FIG. 17(b) shows isoelectric potentials $V_1$ to $V_4$ applied to the respective electrodes in the electrode pattern by resistive dividing.

FIG. 18(a) shows the applied voltages shown in FIG. 17(b). FIG. 18(b) shows effective refractive indices $n_1$ to $n_4$ generated according to the respective electrodes when potentials such as shown in FIG. 18(a) are applied. When the isoelectric potentials $V_1$ to $V_4$ formed by resistive dividing are applied to the respective electrodes 12-1 to 12-4 in the electrode pattern, the effective refractive indices $n_1$ to $n_4$ changing in equal steps occur as shown in FIG. 18(b). However, to obtain an ideal refractive index profile (1800 in FIG. 18(b)) such as shown in FIG. 15 in patent document 4, effective refractive indices $n_1$ to $n_4$ that the respective electrodes 12-1 to 12-4 generate must be individually fine-adjusted as shown by arrows in FIG. 18(b).

In this way, in the electrode pattern 12 arranged in equally spaced concentric circles, it is extremely difficult to set the voltage by using a resistive dividing method and to fine-adjust the applied voltage so as to form the refractive index gradient as designed. Furthermore, with the resistive dividing method, since the voltage to be applied to each individual electrode cannot be finely adjusted, it has not been possible to form a liquid crystal lens having an ideal refractive index profile.

Patent document 1: Japanese Unexamined Patent Publication No. S62-56918 (FIG. 2)

Patent document 2: Japanese Unexamined Patent Publication No. S62-36632 (page 3, FIG. 1)

Patent document 3: Japanese Patent No. 2651148 (page 1, FIG. 1)

Patent document 4: Japanese Patent No. 3047082 (page 4, FIGS. 1 and 3)

SUMMARY OF THE INVENTION

Accordingly, it is an object of the present invention to provide a liquid crystal optical element and a method for manufacturing thereof that can solve the above outlined problems.

It is another object of the present invention to provide a liquid crystal optical element that is inexpensive, has an ideal refractive index profile, and functions as a high-performance gradient-index lens, and a method for manufacturing thereof.

It is a further object of the present invention to provide a liquid crystal optical element that functions as a gradient-index lens whose focal length can be varied without using any moving parts, and a method for manufacturing thereof.

It is a still further object of the present invention to provide a liquid crystal optical element that functions as a high-performance gradient-index lens that has no viewing angle dependence, and a method for manufacturing thereof.

According to the present invention, there is provided a liquid crystal optical element as a variable focus gradient-index lens for a light beam incident from a light source that includes a first planar substrate, a second planar substrate, a liquid crystal provided between the first and second planar substrates, an electrode pattern formed on one of the first and second planar substrates and having a plurality of regions each for varying an effective refractive index for a light beam, and a counter electrode, formed on the other one of the first and second planar substrates, for applying voltage with respect to the electrode pattern, wherein the effective refractive index for a light beam varies with the square of the distance from the center of the liquid crystal optical element along a radial direction across the liquid crystal optical element when voltage is applied between the electrode pattern and counter electrode.

According to the present invention, there is also provided a liquid crystal optical element as a variable focus gradient-index lens for incident light that includes a first planar substrate, a second planar substrate, a liquid crystal provided between the first and second planar substrates, an electrode pattern formed on one of the first and second planar substrates and having a plurality of regions each for varying an effective refractive index for a light beam by a respectively different degree, and a counter electrode, formed on the other one of the first and second planar substrates, for applying voltage with respect to the electrode pattern, wherein the effective refractive index N for the light beam varies with the distance x from the center of the electrode pattern so as to substantially satisfy a relationship defined by the following equation (1) when voltage is applied between the electrode pattern and counter electrode, $$N = N_0 - aX^2 - (bX^4 - cX^6 - dX^8 - \ldots) \tag{1}$$

where $N_0$ is a reference effective refractive index of the liquid crystal, a is a nonzero constant, and b, c, and d are constants.

Preferably, the liquid crystal optical element according to the present invention is applied as a variable focal length gradient-index lens having focusing power.

Preferably, in the liquid crystal optical element according to the present invention, regions where the effective refractive index N for the light beam varies with the distance x from the center of the electrode pattern so as to substantially satisfy the relationship defined by the equation (1) constitute a portion of the electrode pattern.

Preferably, in the liquid crystal optical element according to the present invention, the regions where the effective refractive index N for the light beam varies with the distance x from the center of the electrode pattern so as to substantially satisfy the relationship defined by the equation (1) are formed only in the center portion of the aperture of the liquid crystal optical element.

Preferably, the liquid crystal optical element according to the present invention further comprises selective voltage applying means for selectively applying voltage only to regions formed in a peripheral portion of the electrode pattern so as to not vary the effective refractive index therein.

Preferably, the liquid crystal optical element according to the present invention further comprises resistors, respectively connected between the plurality of regions, for applying resistively divided voltage to the plurality of regions.

Preferably, the liquid crystal optical element according to the present invention further comprises voltage applying means for applying voltage of different values between the plurality of regions.

Preferably, in the liquid crystal optical element according to the present invention the amount by which each of the plurality of regions causes the effective refractive index to change is set substantially constant across the plurality of regions.

Preferably, in the liquid crystal optical element according to the present invention the potential difference between each of the plurality of regions is set substantially constant across the plurality of regions.

Preferably, in the liquid crystal optical element according to the present invention the amount by which each of the plurality of regions causes the effective refractive index to change is set substantially constant across the plurality of regions, and potential difference between each of the plurality of regions is set substantially constant across the plurality of regions.

Preferably, in the liquid crystal optical element according to the present invention the plurality of regions are arranged so that the effective refractive index for the light beam can be set at a finer level in the center portion of the electrode pattern than in the peripheral portion thereof. The center portion of the refractive index profile can then be formed into a smoother shape.

Preferably, in the liquid crystal optical element according to the present invention, the liquid crystal is arranged in a liquid crystal layer so that the long axes of liquid crystal molecules partially align in a plurality of directions including at least two directions oriented at right angles to each other. A liquid crystal optical element free from viewing angle dependence can thus be achieved.

Preferably, in the liquid crystal optical element according to the present invention, the liquid crystal is arranged in the liquid crystal layer so that the long axes of the liquid crystal molecules are partially and randomly oriented. A liquid crystal optical element free from viewing angle dependence can thus be achieved.

Preferably, in the liquid crystal optical element according to the present invention, the liquid crystal is arranged in the liquid crystal layer in the form of capsules.

According to the present invention, there is also provided a method for manufacturing a liquid crystal optical element that includes a first planar substrate, a second planar substrate, a liquid crystal provided between the first and second planar substrates, an electrode pattern formed on one of the first and second planar substrates and having a plurality of regions each for varying an effective refractive index for the incident light by a respectively different degree, and a counter electrode, formed on the other one of the first and second planar substrates, for applying voltage with respect to the electrode pattern, wherein the effective refractive index N for the light beam varies with the distance x from the center of the electrode pattern so as to substantially satisfy the relationship defined by the equation (1) when voltage is applied between the electrode pattern and the counter electrode, the method includes the steps of determining a desired variable focus gradient-index lens characteristic that shows effective refractive index values corresponding to pupil coordinates, dividing a maximum effective refractive index that the lens characteristic shows, by the number of the plurality of regions, determining the pupil coordinates of points at which the divided effective refractive indices intersect the lens characteristic, and setting the plurality of regions so that the pupil coordinates of the intersection points each represent a center of a region-to-region gap.

According to the present invention, it is possible to provide a liquid crystal optical element that can be used as a high-performance gradient-index lens that is simple in structure and can easily produce a required refractive index profile.

By using the liquid crystal optical element according to the present invention, a variable focal length optical system having no moving parts can be constructed. The variable focal length optical system using the liquid crystal optical element according to the present invention can be fabricated at low cost and/or in a space-saving fashion because of the lack of moving parts.

With the prior art liquid crystal element constructed using parallel planar substrates (for example, refer to patent document 4), it has not been possible to achieve an ideal refractive index profile which could be achieved with the prior art hollow liquid crystal lens (for example, refer to patent document 1), and it has only been possible to obtain a characteristic far short of the design value. In contrast, according to the present invention, a liquid crystal optical element that functions as a gradient-index lens having an ideal refractive index profile can be achieved while using parallel planar substrates.

Furthermore, according to the present invention, a liquid crystal optical element can be achieved, which can be used as a high-performance gradient-index lens that is not only difficult to exhibit polarization dependence, but is relatively free from viewing angle dependence.

BRIEF DESCRIPTION OF THE DRAWINGS

FIG. 1 is a diagram showing one example of a cross-sectional structure of a liquid crystal optical element according to the present invention.

FIG. 2 is a diagram showing one example of a transparent electrode pattern.

FIG. 6 is a diagram showing by way of example the design values of the transparent electrode pattern.

FIG. 8 is a diagram showing by way of example the voltages applied to the transparent electrode pattern.

FIG. 9(a) is a diagram showing an example in which the focus of an optical system is set to infinity, and FIG. 9(b) is a diagram showing an example in which the focus of the optical system is set to a near object.

FIG. 14 is a diagram showing another example of voltage application to the rings shown in FIG. 13.

DETAILED DESCRIPTION OF THE PREFERRED EMBODIMENT

Figure 3A:
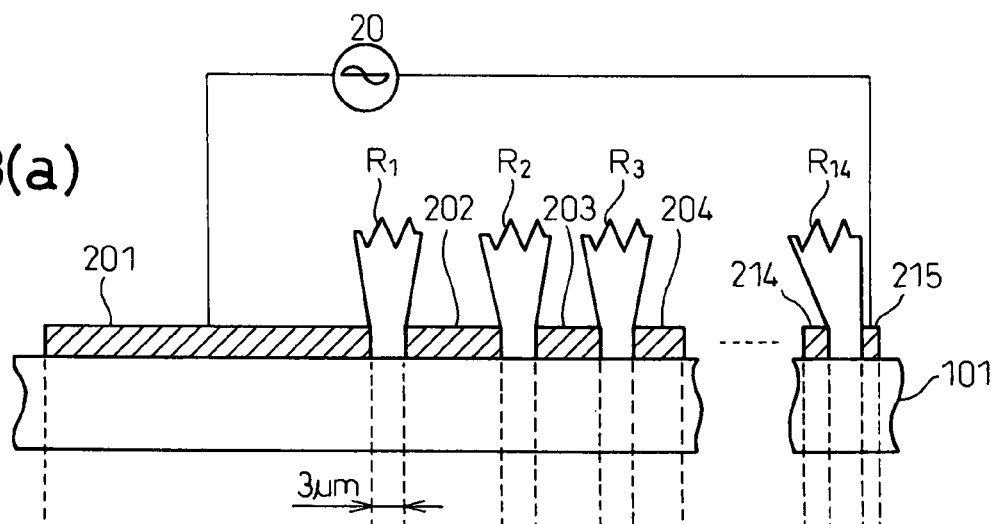
FIG. 3(a) is an enlarged view showing a portion of the transparent electrode pattern.

A liquid crystal optical element and a method for manufacturing thereof according to the present invention will be described below with reference to the drawings.

FIG. 1 shows a cross-sectional view of a liquid crystal optical element 100 according to the present invention.

The direction shown by arrow A in the figure indicates the direction from which light is incident on the liquid crystal optical element 100. In FIG. 1, an alignment film 102 and a transparent electrode 107 having a refractive index modulating transparent electrode pattern 200 are formed on a transparent substrate 101 on the light incident side. On the other hand, an alignment film 104 and a transparent counter electrode 108 are formed on a transparent substrate 105 on the opposite side. A liquid crystal 106 with a thickness of 20 μm is sandwiched between the two transparent substrates 101 and 105 and sealed by a sealing member 103. The thickness of the constituent elements shown in FIG. 1 is exaggerated for illustrative purposes, and the actual thickness ratio between the constituent elements is different from what is shown here.

The two transparent substrates 101 and 105 are each formed from glass material, and the sealing member 103 is made of resin. In the present embodiment, the liquid crystal 106 is sandwiched between two transparent substrates 101 and 105 is a homogeneously aligned liquid crystal, but a vertically aligned liquid crystal may be used instead. Further, a 90-degree twisted nematic (TN) liquid crystal may be used for the liquid crystal 106. In the 90-degree TN liquid crystal, when voltage greater than given voltage is applied to the liquid crystal, the twist of the liquid crystal molecules is disrupted, and the polarization plane of the emergent light is rotated, but this type of liquid crystal can be used without any problems for the purpose intended here. Compared with a homogeneously aligned liquid crystal, a 90-degree TN liquid crystal has an advantage in that it is relatively free from viewing angle dependence.

FIG. 2 shows one example of the refractive index modulating transparent electrode pattern 200 in the liquid crystal optical element 100 shown in FIG. 1.

As shown in FIG. 2, the electrode pattern 200 comprises concentric rings 201 to 215 formed within a range of an effective diameter 10, each ring being spaced apart from one another by a small distance for insulation. Prescribed AC voltage from a power supply 20 is applied between the rings 201 and 215, and resistors $R_1$ to $R_{14}$ are interposed between the respective rings, i.e., the resistor $R_1$ between the rings 201 and 202, the resistor $R_2$ between the rings 202 and 203, and the resistor $R_{14}$ between the rings 214 and 215. All of the resistors $R_1$ to $R_{14}$ have the same resistance value.

FIG. 3 shows the relationship between the respective rings 201 to 215 and the voltage applied to them.

FIG. 3(a) is an enlarged cross-sectional view of a portion of the transparent electrode pattern 200 formed on the transparent substrate 101. The ring-to-ring microscopic gap is set to 3 μm for all of the rings (the gap shown is exaggerated for illustrative purposes). Further, as shown in FIG. 2, the rings are connected by respective resistors $R_1$ to $R_{14}$, and AC voltage is applied from the power supply 20.

Figure 3B:
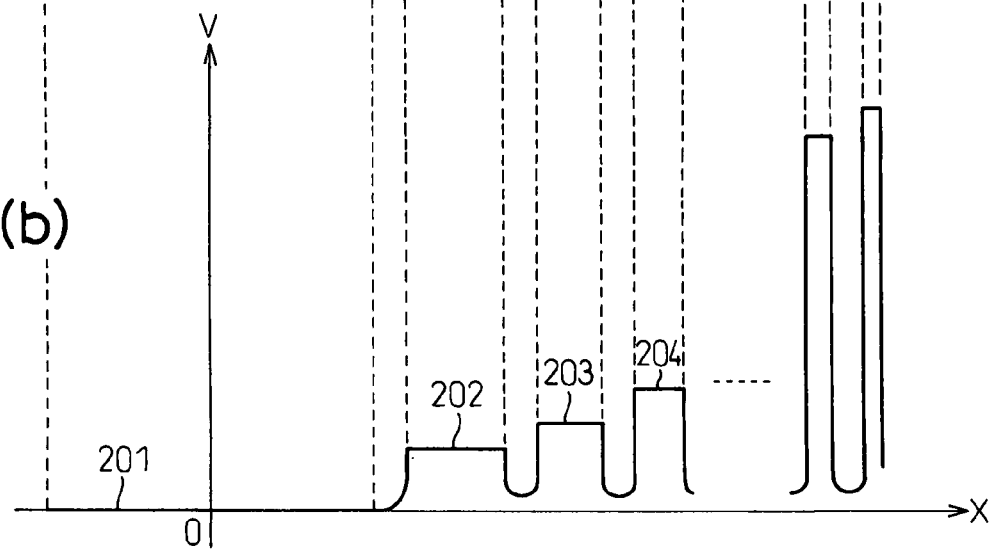
FIG. 3(b) is a diagram showing by way of example the voltages applied to respective rings.

FIG. 3(b) shows the RMS voltage applied to the respective rings 201 to 215, relative to the reference voltage V (the voltage applied to the ring 201, which is assumed to be 0[V] in the illustrated example). Generally, the liquid crystal used in a liquid crystal optical element responds to the RMS value of the applied voltage. Further, if a DC voltage component is applied to the liquid crystal for an extended period of time, trouble such as image sticking and decomposition occurs in the liquid crystal. Accordingly, the liquid crystal is driven by applying AC voltage across the transparent electrodes of the liquid crystal optical element so that the DC voltage component will not be applied to the liquid crystal. Here, the reference voltage 0[V] for the liquid crystal optical element is actually the voltage applied across the liquid crystal layer, and this voltage can be set to any suitable value. Often, the state in which the applied voltage is 0[V] is taken as the reference, but another suitable voltage (for example, 3[V]) may be used as the reference voltage.

A method for designing the transparent electrode pattern 200 will be described with reference to FIG. 4.

First, the lens characteristic that the liquid crystal optical element 100 should ideally have is determined. The curve 401 in FIG. 4 is one example of the lens characteristic that the liquid crystal optical element 100 should ideally have, and shows the relationship between the effective refractive index (N) and the position (X) represented by pupil coordinates, the curve 401 being expressed by the following equation (1).

$$N = N_0 - aX^2 - (bX^4 - cX^6 - dX^8 - \ldots) \quad (1)$$

where $N_0$ is the reference effective refractive index of the liquid crystal 106, a is a nonzero constant, and b to d are constants. While the above equation has been shown up to the fourth order in X, it is possible to consider a higher order term, if needed.

Further, as an example, a to d can be defined as shown by equations (2) to (5) below.

$$a = 1/(2 \cdot f \cdot w) \quad (2)$$

$$b = 1/(2 \cdot a^2) \quad (3)$$

$$c = 1/(4 \cdot a^4) \quad (4)$$

$$d = 1/(8 \cdot a^6) \quad (5)$$

where f is the focal length of the gradient-index lens, and w is the thickness of the liquid crystal 106.

When b=c=d=0, the equation (1) is given as equation (6) below, which is an equation corresponding to a spherical lens. That is, the effective refractive index varies with the square of the distance from the center.

$$N = N_0 - aX^2 \quad (6)$$

In this case, since the thickness of the liquid crystal 106 of the liquid crystal optical element 100 is 20 μm, $N_0$ (reference effective refractive index) is 1.74, the effective diameter (Xmax) of the liquid crystal optical element 100 is 1.22 mm, and the maximum value of N, i.e., N(Xmax), is 1.5, it follows that, from the above equations (6) and (2), f is 155 mm.

The above lens characteristic 401 has been determined by assuming a case where b to d in the equation (1) are all zero, but if all of b to d in the equation (1) are not zero, the lens characteristic will be that of an aspherical lens.

Next, the number of rings is determined, and the section between the maximum effective refractive index $N_0$ and the minimum effective refractive index $N_{15}$ shown by the lens characteristic (curve 401) is divided into equal segments by the number of rings (15 in the present embodiment) forming the transparent electrode pattern 200.

Next, the points at which the 15 equally divided effective refractive index values ($N_1$ to $N_{15}$) intersect the curve 401 are denoted as $P_1$ to $P_{15}$, respectively.

Then, pupil coordinates $X_1$ to $X_{15}$ corresponding to the respective intersection points $P_1$ to $P_{15}$ are obtained.

Next, the ring-to-ring gap is set to 3 μm for all of the rings, and the respective rings 201 to 215 are set so that the pupil coordinates $X_1$ to $X_{15}$ represent the radii defined by the centers of the respective ring-to-ring gaps. In the example of FIG. 4, the effective refractive index to be modulated by the ring 201 is $N_1$, not $N_0$, but this is due to the quantization. Accordingly, a potential profile may be provided to each ring so as to adjust the $N_1$ to $N_0$, $N_2$ to $N_1$, and $N_n$ to $N_{n-1}$. In this case the same effect can be obtained.

Figure 5:
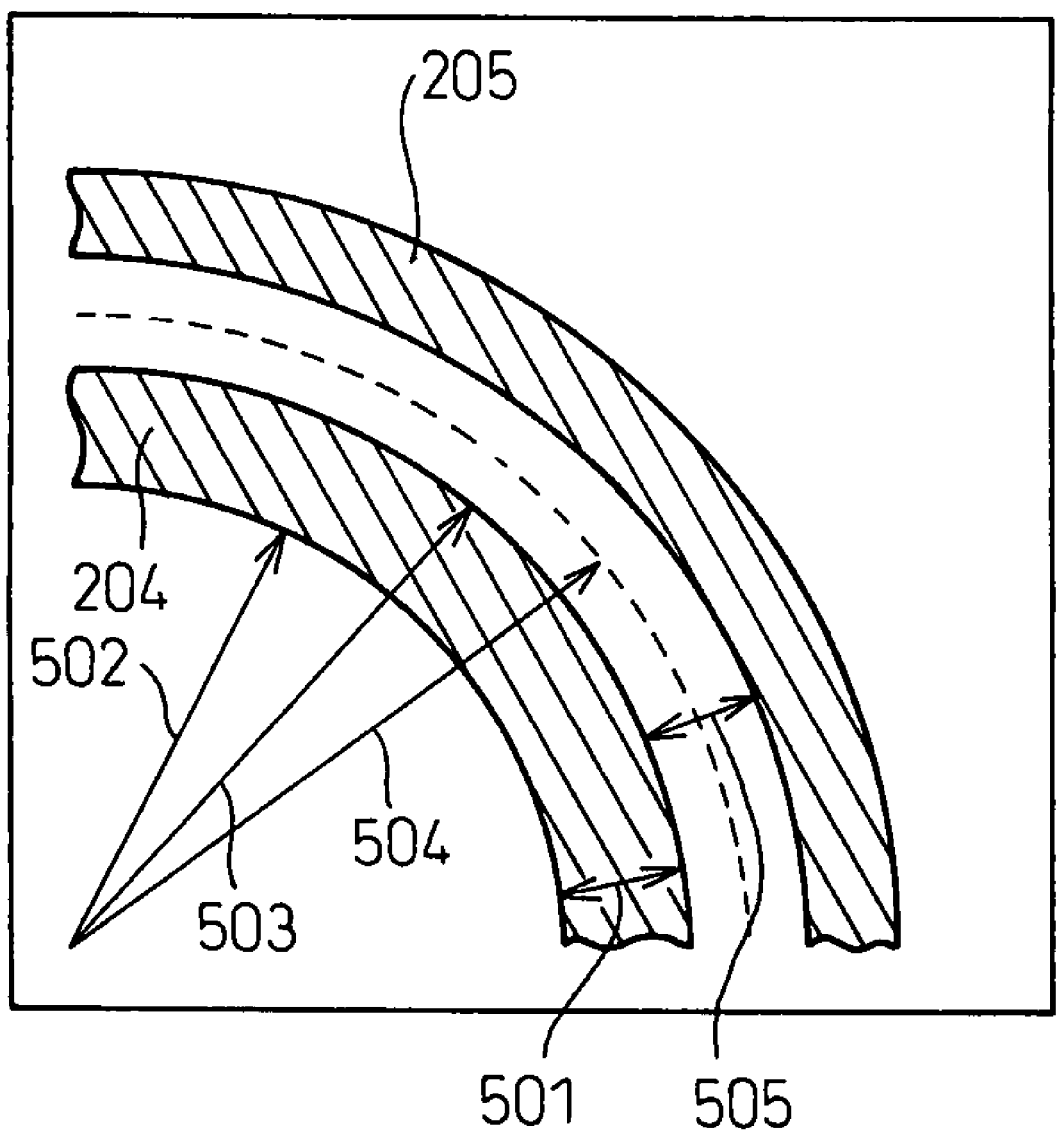
FIG. 5 is a diagram for explaining a method for designing the rings.

FIG. 5 shows the relationship between each ring and the radius at the gap center.

In FIG. 5, ring width 501 (mm), inner radius 502 (mm), outer radius 503 (mm), gap center radius 504 (mm), and gap width 505 (mm) are shown for the ring 204. Since the gap width 505 is set to 0.003 mm (3 μm) for all the rings, the ring width 501 (mm), inner radius 502 (mm), and outer radius 503 (mm) are determined for each particular ring by using the gap center radius 504 (mm) obtained from FIG. 4, and the thus determined values are taken as the design values of that ring.

FIG. 6 shows by way of example the design values, i.e., the ring width 501 (mm), inner radius 502 (mm), outer radius 503 (mm), gap center radius 504 (mm), and gap width 505 (mm), for the respective rings in the transparent electrode pattern 200.

In the present embodiment, since there are no rings outside the outermost ring 215, the respective rings 201 to 215 are designed by making the gap center radius associated with the outermost ring 215 coincide with the effective diameter 10 (radius 1.22 mm) of the optical system that uses the liquid crystal optical element 100, and the transparent electrode pattern 200 is generated to match the thus designed rings.

Figure 7:
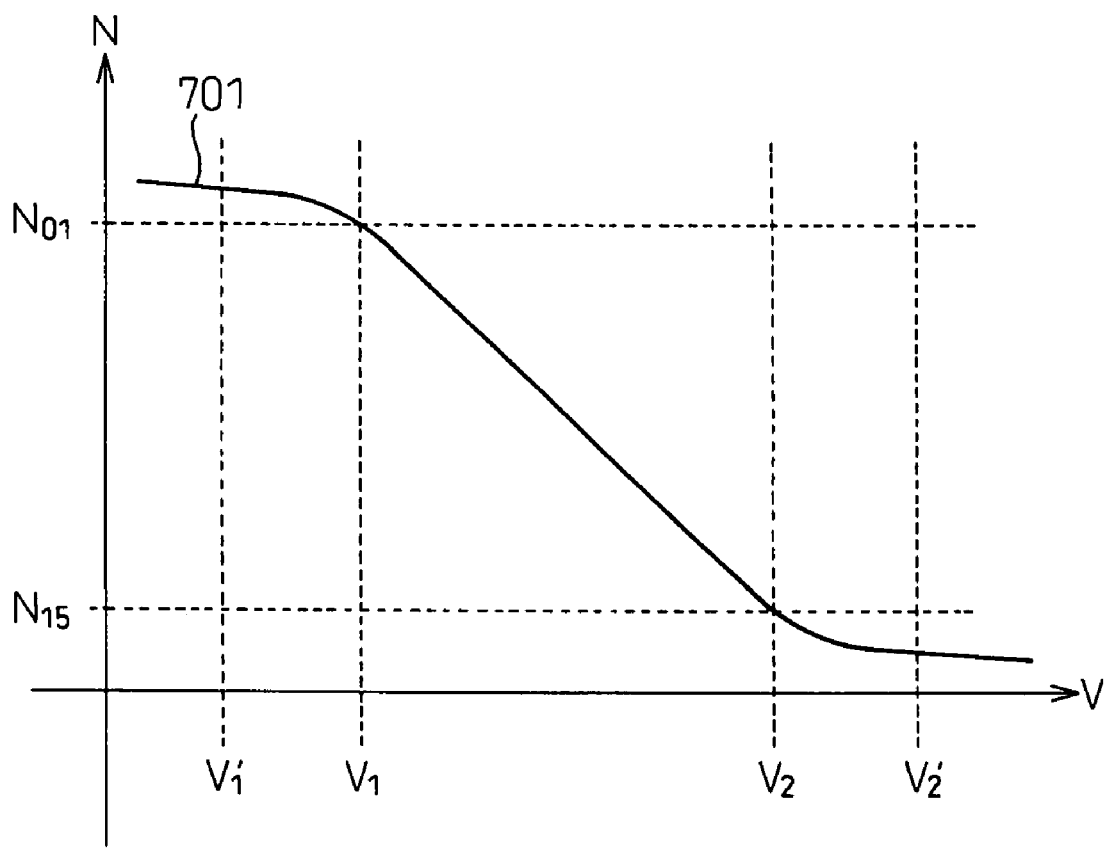
FIG. 7 is a diagram showing the relationship between applied voltage and effective refractive index in liquid crystal.

FIG. 7 shows the relationship 701 between the applied voltage and the effective refractive index in the liquid crystal 106 used in the present embodiment.

As shown in FIG. 7, when the plane of linearly polarized incident light is made to match the orientation direction of the liquid crystal 106, the homogeneously aligned liquid crystal 106 exhibits a nonlinear characteristic such that the effective refractive index gradually decreases as the applied voltage increases. However, since there is a region where the effective refractive index changes substantially linearly between the applied voltage range of $V_1$ to $V_2$, it is preferable to use this region as the region for controlling the effective refractive index.

In the present embodiment, $V_1$ is set to 1.4 [V] (reference voltage) and applied to the ring 201 in the transparent electrode pattern 200, and $V_2$ is set to 2.7 [V] and applied to the ring 215. In this case, the value at $N_{01}$ in FIG. 7 represents the reference effective refractive index. On the other hand, the reference voltage 0 [V] (reference voltage) is applied to the transparent counter electrode 108.

The voltage applied to the respective rings of the transparent electrode pattern 200 is shown by way of example in FIG. 8. As shown in FIG. 8, since the rings are connected by respective resistors $R_1$ to $R_{14}$ having the same resistance value, the voltage $V_2$ applied to the ring 215 is equally divided into 15 fractions (resistively divided) and applied to the respective rings.

The liquid crystal 106 exhibits effective refractive index inversely proportional to the applied voltage, as shown in FIG. 7. Therefore, when voltage such as shown in FIG. 8 is applied to the respective rings 201 to 215, the liquid crystal optical element 100 has a refractive index profile such as shown by 402 in FIG. 4. That is, when voltage such as shown in FIG. 8 are applied to the transparent electrode pattern 200, the liquid crystal optical element 100 functions as a gradient-index lens having a refractive index profile 402 which is substantially close to the initially determined lens characteristic 401. More specifically, the electrode pattern 200 is designed so that when voltage such as shown in FIG. 8 are applied between the transparent electrode pattern 200 and the counter electrode 108, the effective refractive index N for the light beam varies with the distance x from the center of the electrode pattern so as to substantially satisfy the relationship defined by the previously given equation (1).

As earlier described, since the refractive index profile 402 of the liquid crystal optical element 100 is such that the refractive index is highest at the center and gradually decreases toward the periphery, the liquid crystal optical element 100 functions as a convex lens. Further, when the refractive index profile 402 shown in FIG. 4 is generated by applying the voltages shown in FIG. 8 to the respective rings 201 to 215, the liquid crystal optical element 100 functions as a gradient-index lens having a focal length of about 155 mm.

Figure 4:
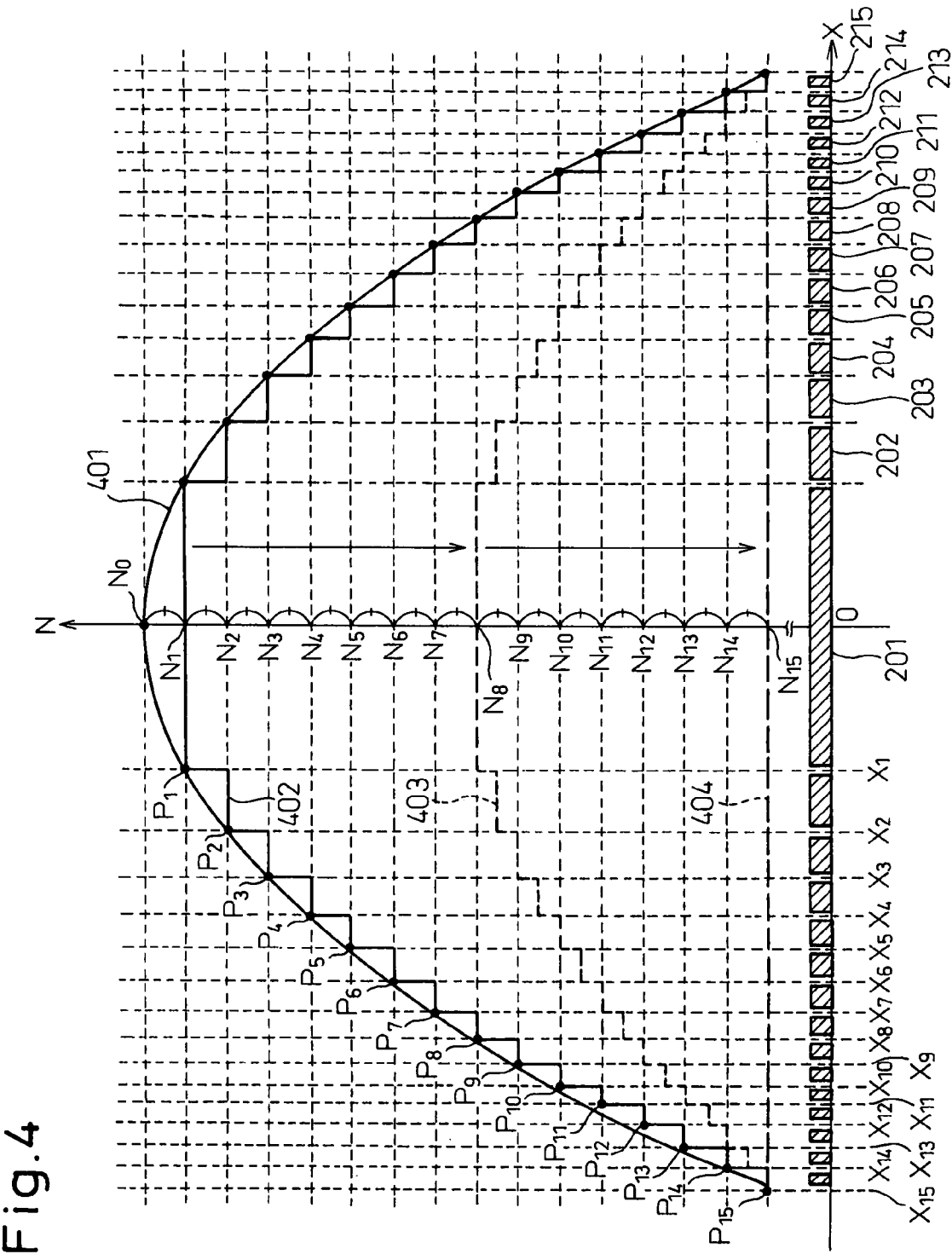
FIG. 4 is a diagram for explaining a method for designing the transparent electrode pattern.

When a refractive index profile such as shown by 403 in FIG. 4, whose maximum effective refractive index is approximately one half of that of 402, is generated by increasing the voltage applied to the electrode 201, the liquid crystal optical element 100 functions as a gradient-index lens having a focal length of about 310 mm which is about twice the focal length in the case of the refractive index profile 402. A similar effect can be achieved by reducing the voltage applied to the electrode 215 while keeping the application voltage to the electrode 215 unchanged.

When voltage applied to the electrode 201 is varied, and $V_2$ is set to about 2.7 [V], achieving a substantially flat refractive index profile such as shown by 404 in FIG. 4, the liquid crystal optical element 100 has an infinite focal length, that is, it functions as a plain glass plate. In this case, a uniform voltage, including the reference voltage, is applied to all of the rings 201 to 215. That is, the refractive index profile becomes flat despite the uniform voltage value, and the liquid crystal optical element 100 functions as a plain glass plate. If voltage is not applied to the liquid crystal 106, it is basically the same as a plain glass plate, but it is preferable to apply a certain amount of uniform bias voltage in order to maintain the ordered structure of the liquid crystal 106. To make it function as a concave lens, the voltage profile shown in FIG. 8 need only be inverted to apply voltages to the respective electrodes. Therefore, no further description will be given herein.

In the case of 403 and 404 in FIG. 4 also, when voltage such as shown in FIG. 8 is applied between the transparent electrode pattern 200 and the counter electrode 108, the effective refractive index N for the light beam varies with the distance x from the center of the electrode pattern so as to substantially satisfy the relationship defined by the previously given equation (1). However, in the case of 403 and 404 in FIG. 4, since the f-number is different between them, the value of the constant a is also different correspondingly.

By varying the voltage applied to the rings 201 to 215 as described above, the focal length of the liquid crystal optical element 100 can be varied within a prescribed range. For example, the liquid crystal optical element 100 can be switched to function as a gradient-index lens acting as a convex lens or a concave lens or to function as a plain glass plate.

In the above-described design of the transparent electrode pattern 200, the section between the maximum effective refractive index $N_0$ and the minimum effective refractive index $N_{15}$ shown by the curve 401 has been divided into equal segments by the number of rings (15 in the present embodiment) forming the transparent electrode pattern 200. However, since the design is such that the refractive index N for the light beam varies with the distance x from the center of the electrode pattern so as to substantially satisfy the relationship defined by the previously given equation (1), the voltage to be applied to the respective rings of the transparent electrode pattern 200 can be set so as to change in equal steps, and prescribed voltage can be easily applied to the respective rings by resistive dividing. In this case, since the design is such that the effective refractive index N for the light beam varies with the distance x from the center of the electrode pattern so as to substantially satisfy the relationship defined by the previously given equation (1), the liquid crystal optical element can be made to function as a gradient-index lens having a refractive index profile substantially close to the initially determined lens characteristic 401.

FIG. 9 shows one example of an optical device 1 that uses the liquid crystal optical element 100 according to the present invention. The optical device 1 is, for example, a digital camera, and comprises a first liquid crystal optical element 100-1, a second liquid crystal optical element 100-2, a fixed focus lens 2, a CCD imager 3, and a voltage controller 4, which includes an AC power supply 20.

Here, the first liquid crystal optical element 100-1 and the second liquid crystal optical element 100-2 are each identical in structure to the liquid crystal optical element 100 described above. However, the first liquid crystal optical element 100-1 and the second liquid crystal optical element 100-2 are arranged along the optical axis of the optical device 1 so that the long axis direction of the liquid crystal molecules in the former is oriented at right angles to the long axis direction of the liquid crystal molecules in the latter.

When varying the refractive index, viewing angle dependence develops in the liquid crystal optical element. That is, of the components of light passing through the liquid crystal layer, only the component whose polarization direction substantially matches the long axis direction of the liquid crystal molecules is influenced by the change of the refractive index in the liquid crystal. Accordingly, in order that the optical device 1 shown in FIG. 9 properly functions as a digital camera or the like, the two liquid crystal optical elements are arranged at right angles to each other to provide for all polarization directions of the light entering the camera. Here, more than two liquid crystal optical elements may be used.

In FIG. 9(a), the focus is set to infinity, and in this case, since uniform voltage is applied to the transparent electrode pattern 200 on each of the first and second liquid crystal optical elements 100-1 and 100-2, the liquid crystal optical elements 100 have no power, and incident light with an effective diameter 10 entering the optical device 1 is focused on the CCD imager 3 only by the fixed focus lens 2.

In FIG. 9(b), the focus is set to a near object, and in this case, voltage such as shown by 801 in FIG. 8 is applied to the transparent electrode pattern 200 on each of the first and second liquid crystal optical elements 100-1 and 100-2, so that each liquid crystal optical element 100 functions as a convex lens having a refractive index profile such as shown by 402 in FIG. 4. Accordingly, the incident light entering the optical device 1 is focused on the CCD imager 3 by the liquid crystal optical elements 100 and the fixed focus lens 2 which together have a focal length (indicated by 6 in the figure) that is different from the focal length (indicated by 7 in the figure) of the fixed focus lens 2 alone.

Here, if the voltage to be applied to the transparent electrode pattern 200 on each of the first and second liquid crystal optical elements 100-1 and 100-2 is varied under the control of a signal supplied from an automatic focus adjusting circuit not shown, an autofocus optical system can be easily constructed without using moving parts. If such an optical system or autofocus optical system capable of switching between different focal lengths without using moving parts is used in a digital camera or a mobile phone, an enormous advantage can be obtained in terms of space and cost reduction.

Figure 10:
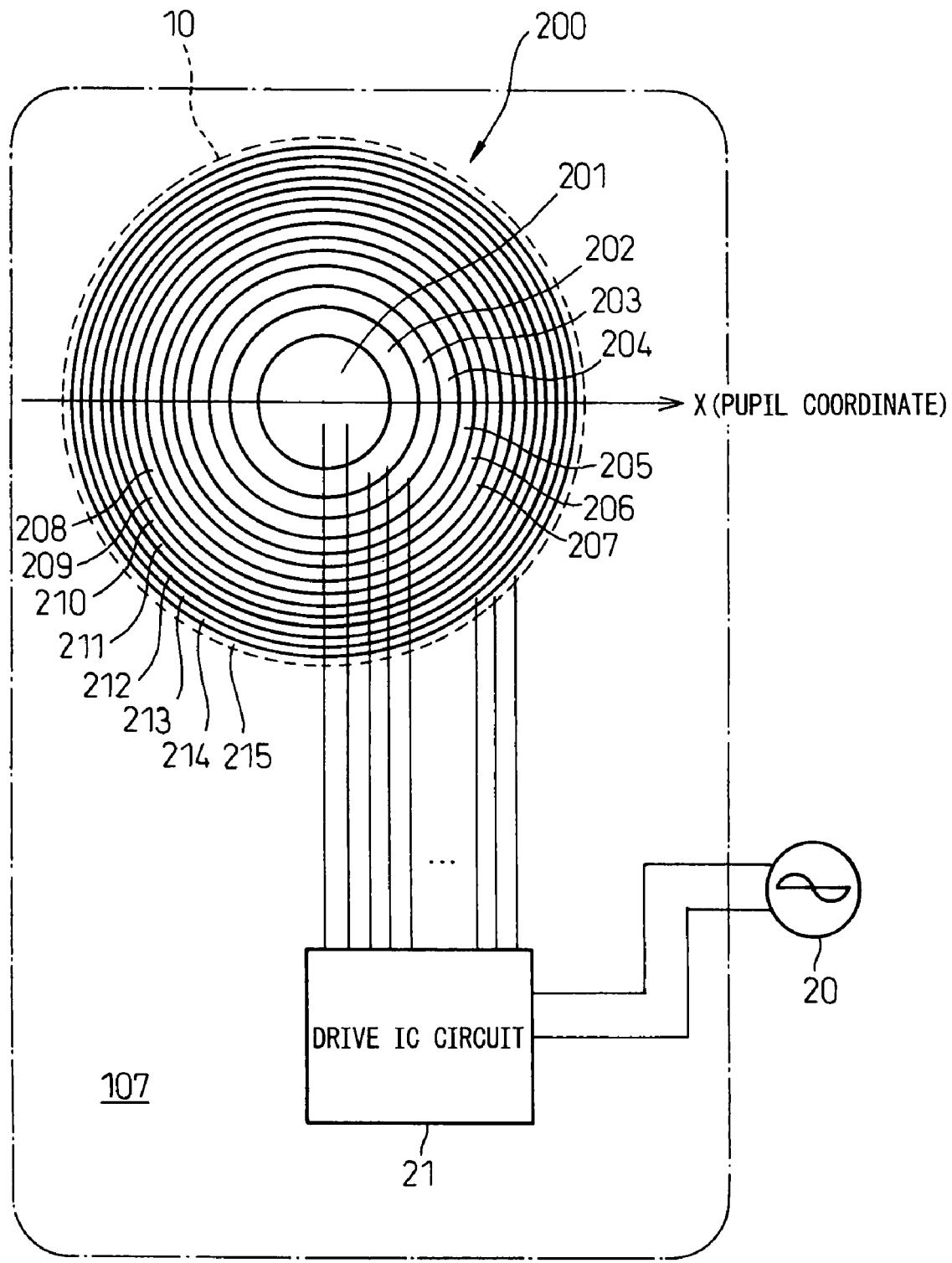
FIG. 10 is a diagram for explaining another method for voltage application to the transparent electrode pattern.

FIG. 10 shows another voltage application method that can be used for the liquid crystal optical element 100 of the present invention.

In FIGS. 2 and 3, resistors having substantially the same resistance value have been provided between the respective rings 201 to 215 so that voltage can be applied by resistive dividing. In contrast, in FIG. 10, a drive IC circuit 21 is provided so that preset voltages can be applied to the respective rings 201 to 215. When the drive IC circuit 21 shown in FIG. 10 is used, there is no need to connect the respective rings 201 to 215 by the resistors $R_1$ to $R_{14}$. The drive IC circuit 21 can employ any suitable design, as long as the circuit is designed so that the preset voltage, for example, the 15 voltage shown in FIG. 8, can be applied to the respective rings 201 to 215. Therefore, the circuit can be readily constructed using known circuit technology. Further, when using the drive IC circuit 21, provisions may be made so that the set values of the voltage to be applied to the respective rings 201 to 215 can be controlled by external signals, or alternatively, a storage area may be provided within the drive IC circuit 21 so that the voltage values can be stored in the storage area.

The voltage application method shown in FIG. 10 can also be applied to the cases of 403 and 404 shown in FIG. 4.

The voltage application method shown in FIG. 10 is particularly effective when nonlinear regions shown in FIG. 7 (for example, the ranges of $V_1'$ to $V_1$ and $V_2$ to $V_2'$) are used in combination with the linear region ($V_1$ to $V_2$). This is because, when determining the refractive index based on the nonlinear characteristic, finer voltage adjustments are needed in order to correct the linearity of the system as a whole, despite the nonlinear characteristic of the liquid crystal.

Figure 11:
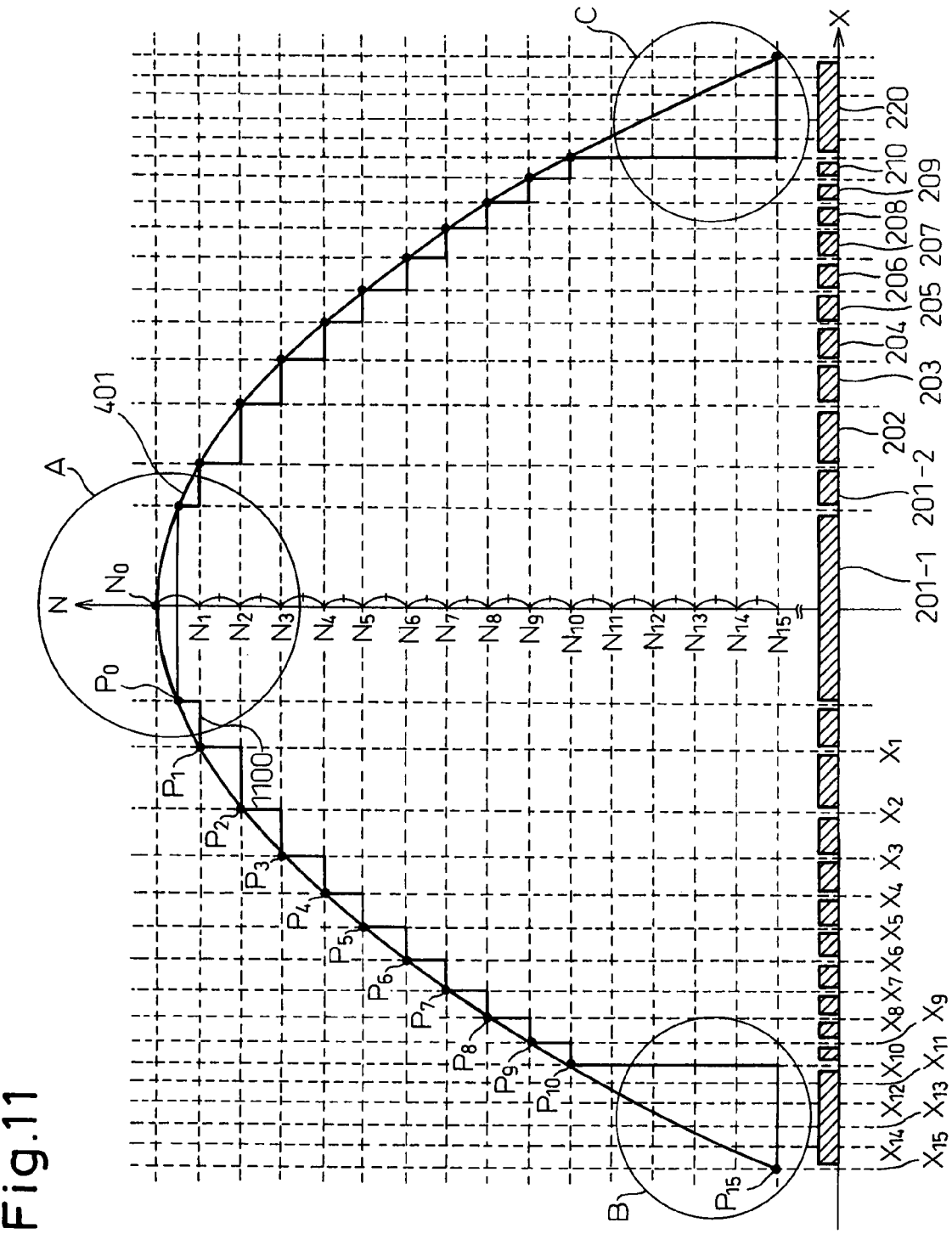
FIG. 11 is a modified example of the ring pattern.

FIG. 11 shows another example of the transparent electrode pattern that can be applied to the liquid crystal optical element 100 of the present invention.

FIG. 11 shows another refractive index profile 1100 that the liquid crystal optical element 100 has. The profile 1100 differs from the refractive index profile 402 shown in FIG. 4 in that (1) in the profile 1100, the center portion A of the profile 402 is divided into smaller segments and in that (2) the peripheral portions B and C in the profile 402 are truncated in the profile 1100.

In the center portion A, a point $P_0$ at which the value of the profile 402 is $(N_0+N_1)/2$ is provided, and the center ring 201 is correspondingly divided into two rings 201-1 and 201-2. This is done to bring the refractive index profile of the liquid crystal optical element 100 closer to the ideal lens characteristic 401, because when the ring 201 in the center portion A is formed larger than the other rings, the center portion of the refractive index profile 402 of the liquid crystal optical element 100 cannot be formed into a smooth shape. Here, the center ring 201 may be divided into the rings 201-1 and 201-2 based on the point where the midpoint between the intersection point P1 and the Y axis intersects the profile 402.

On the other hand, in peripheral portions B and C, a single ring 220 is formed so that the intersection points $P_{11}$ to $P_{15}$ on the lens characteristic 401 are all represented by the refractive index $N_{15}$. Here, the single ring 220 may be formed so that the intersection points $P_{11}$ to $P_{15}$ are all represented by $N_{13}$. The reasons are that the periphery of the refractive index profile does not significantly affect the lens characteristic, and that the widths of the rings in the peripheral portions are extremely small and difficult to form. If rings 211 to 215 are replaced by a single ring 220 as shown in the peripheral portions B and C in FIG. 11, there will be no significant effect on the lens characteristic, in particular, the focal length varying ability of the liquid crystal optical element 100. Here, rather than replacing the rings 211 to 215 by a single ring 220, rings 211 to 215 may be short-circuited.

Though not shown here, rings of equal width may be formed in the peripheral portions of the refractive index profile, rather than forming the rings that match the peripheral portions as shown in FIG. 4. For example, five rings each having a width equal to the average width of the rings 211 to 215 may be formed instead of rings 211 to 215 shown in FIG. 4. As explained above, if the rings are formed in this manner, there will be no significant effect on the lens characteristic, in particular, the focal length varying ability, of the liquid crystal optical element 100.

In this way, all the rings 201 to 215 in the transparent electrode pattern 200 of the liquid crystal optical device 100 do not need to be necessarily formed in such a manner that the effective refractive index N for the light beam varies with the distance x from the center of the electrode pattern so as to substantially satisfy the relationship defined by the previously given equation (1). That is, the rings may not be formed in this manner in regions that do not have a significant effect on the lens characteristic.

Figure 12:
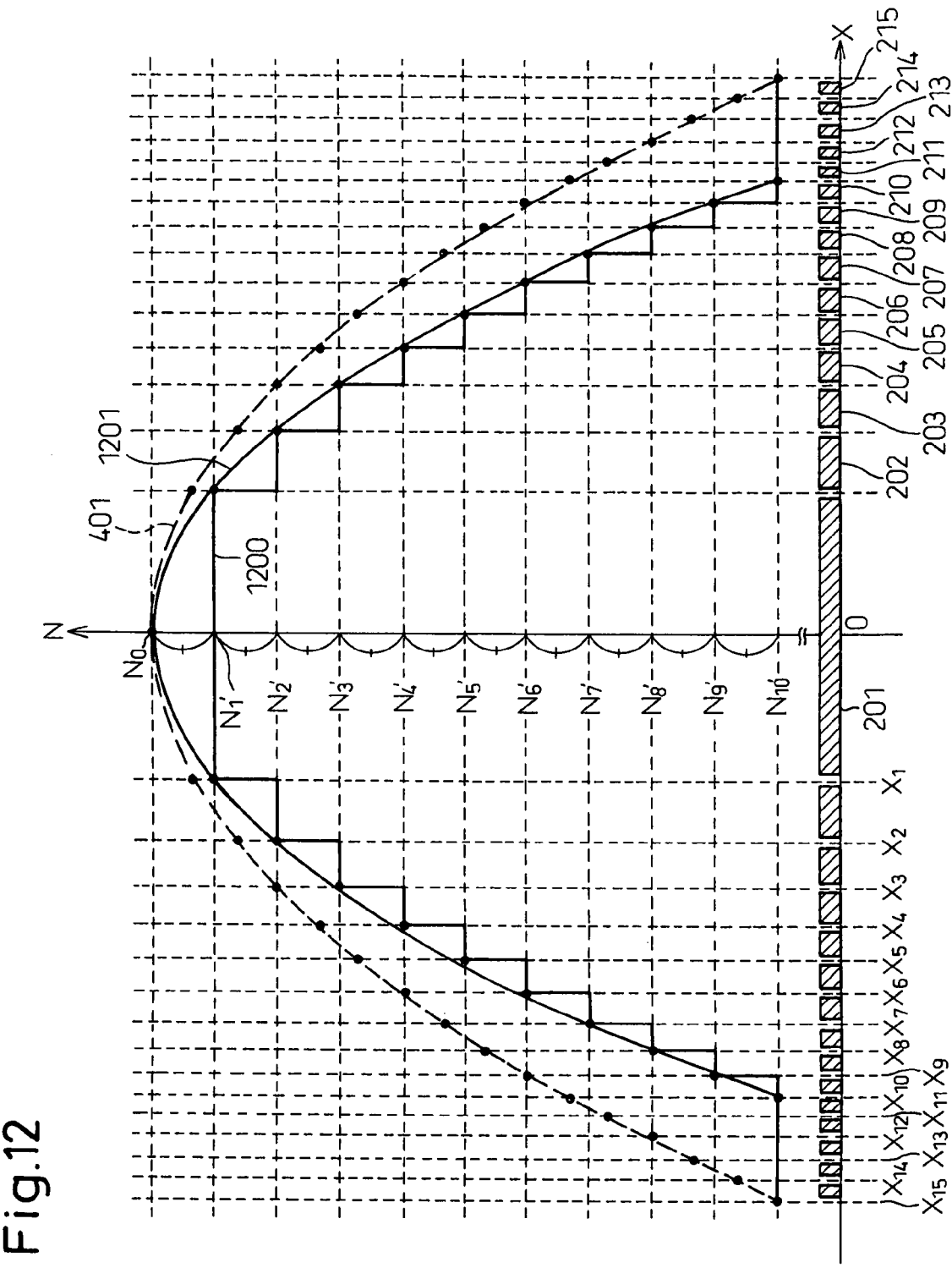
FIG. 12 is a diagram showing still another example of voltage application to the transparent electrode pattern.

FIG. 12 shows an example of still another refractive index profile 1200 that the liquid crystal optical element 100 has.

In the example of FIG. 12, the liquid crystal optical element 100 is designed to produce a different refractive index profile by using the same rings 201 to 215 shown in FIG. 4. In the illustrated example, the profile 1200 is produced by only using rings 201 to 210 by dividing the maximum effective refractive index $N_0$ into 10 equal segments. In this way, the profile 1200, which is different from the refractive index profile 402 shown in FIG. 4, can be provided without modifying rings 201 to 215. The lens characteristic 1201 approximated by the profile 1200 describes a curve sharper than that of the lens characteristic shown in FIG. 4. Therefore, the liquid crystal optical element 100 can produce a focal length shorter in the profile of 1200 than in the profile of 402.

In this way, the focal length of the liquid crystal optical element 100 can be varied by varying the refractive index profile of the liquid crystal optical element 100 without changing the ring pattern. In this case, it is preferable to separately provide a selective voltage applying means in order to hold peripheral rings 211 to 215 at the same potential.

Figure 13:
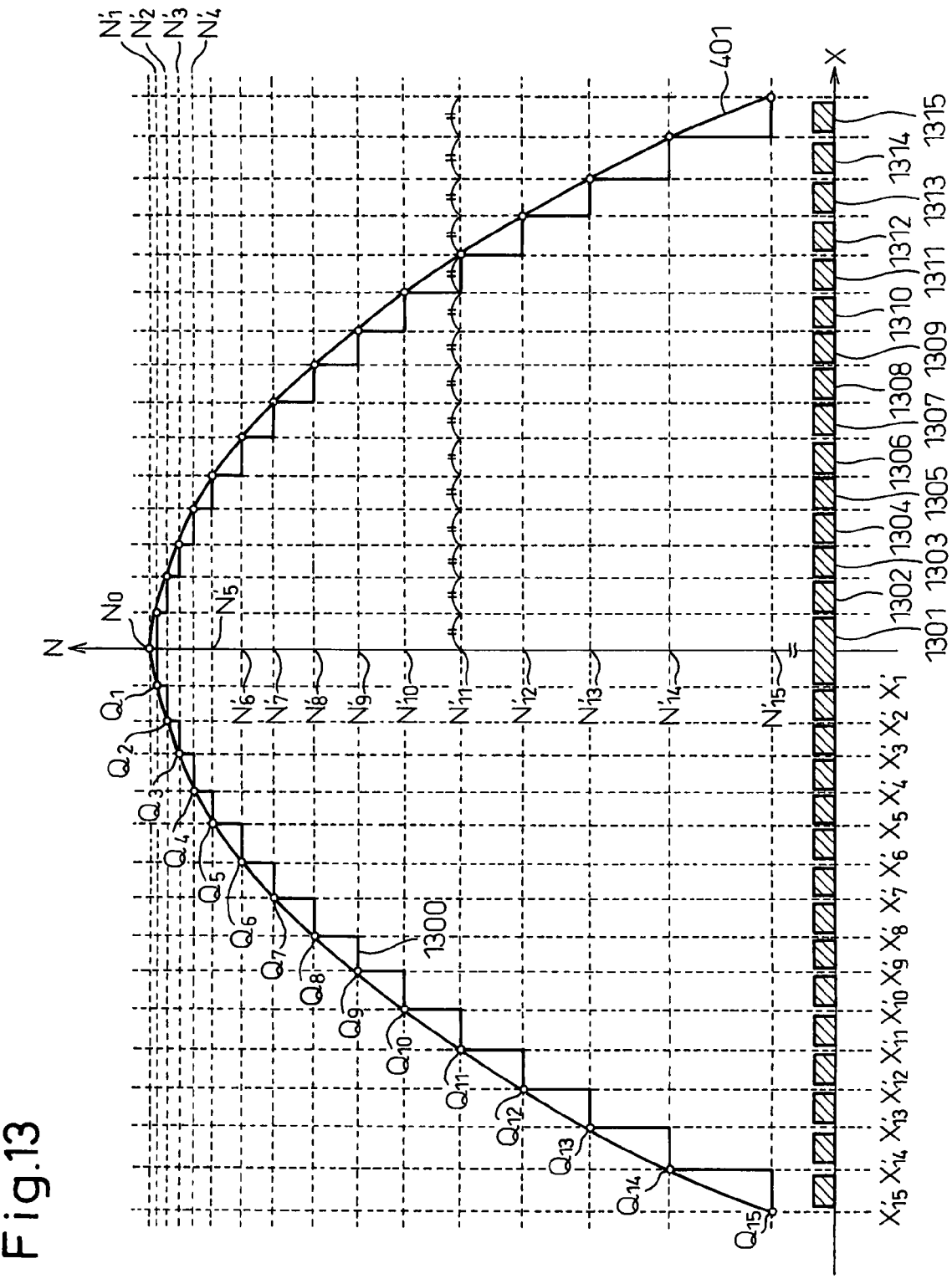
FIG. 13 is a diagram for explaining another method for designing the transparent electrode pattern.

FIG. 13 shows an example of yet another refractive index profile 1300 that the liquid crystal optical element 100 has.

In the example of FIG. 4, the section between the maximum effective refractive index $N_0$ and the minimum effective refractive index $N_{15}$ shown by the lens characteristic (curve 401) has been divided into equal segments by the number of rings (15 in the present embodiment) forming the transparent electrode pattern 200. In contrast, in the example of FIG. 13, 15 rings 1301 to 1315 are formed by dividing the effective diameter 10 (radius 1.22 mm) into equal segments by the number of rings (15 in the present embodiment) forming the transparent electrode pattern 200. In the example of FIG. 13, the rings are formed at equally spaced intervals, but the effective refractive indices $N_1'$ to $N_{15}'$ corresponding to the respective rings are at unequally spaced intervals.

FIG. 14 shows by way of example the voltage applied to the rings 1301 to 1315 shown in FIG. 13.

As shown in FIG. 14, in this example the voltage applied to the respectively rings is unequally spaced so as to match the effective refractive indices $N_1'$ to $N_{15}'$ corresponding to the respective rings. Accordingly, in the example shown in FIG. 13, an individual voltage application method using the drive IC circuit 21 such as shown in FIG. 10 is employed, rather than the resistive dividing method shown in FIG. 2.

When the rings are formed at equally spaced intervals as shown in FIG. 13, and the individual voltage application method using the drive IC circuit 21 such as shown in FIG. 10 is employed to apply voltage to the respective rings, the voltage can be finely adjusted. Accordingly, by using a region where the relationship between the applied voltage and the effective refractive index in the liquid crystal is nonlinear as shown in FIG. 7, individual voltage can be applied to the respective rings in such a manner as to compensate for the nonlinear region. That is, since a liquid crystal can be used over the range of $V_1'$ to $V_2'$ shown in FIG. 7, it is possible to utilize the refractive indices in a wider range. As a result, while using the same liquid crystal 106, the effective refractive index difference can be made larger, and accordingly, a shorter focal length can be achieved while using the same liquid crystal 106.

Figure 15A:
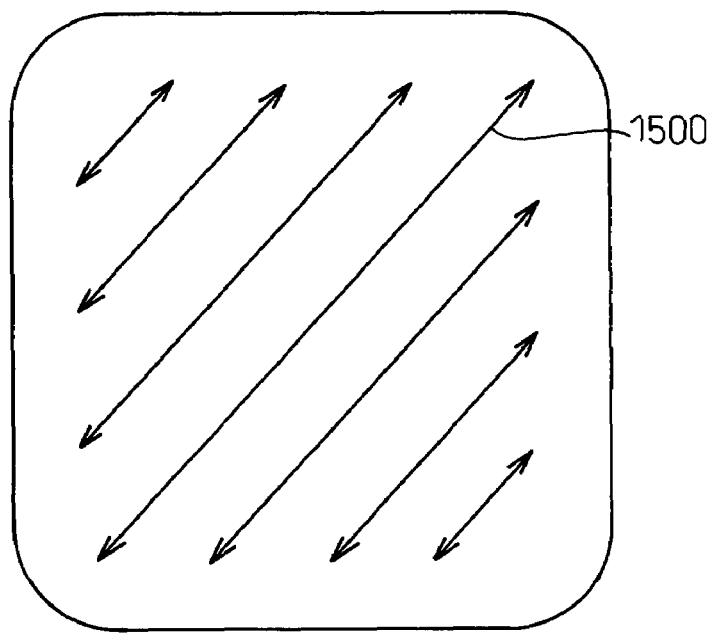
FIG. 15(a) is a diagram showing one example of the orientation direction of molecules in liquid crystal 106.
Figure 15B:
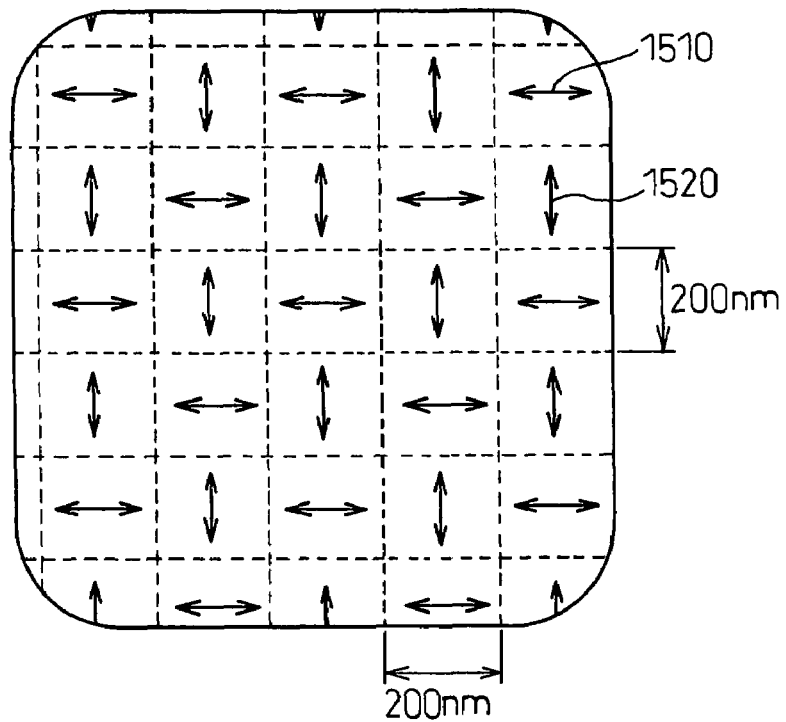
FIG. 15(b) is a diagram showing another example of liquid crystal.

FIG. 15 is a diagram showing another example of the liquid crystal that can be used in the liquid crystal optical element 100 of the present invention. FIG. 15(a) shows one example of the long axis direction (rubbing direction) of the molecules of the previously described liquid crystal 106, and FIG. 15(b) a diagram showing another example of the liquid crystal that can be used in the liquid crystal optical element 100 of the present invention.

As shown in FIG. 15(a), the orientation direction of the molecules of the previously described liquid crystal 106 is generally aligned in the direction indicated by the arrow 1500 in the figure. However, as previously explained with reference to FIG. 9, the liquid crystal optical element 100 using such a liquid crystal has polarization dependence. In view of this, in FIG. 15(b), the liquid crystal 106 is divided into microscopic regions (each measuring 200 nm×200 nm), and the rubbing direction is changed for each region so that the rubbing direction in one region is oriented at right angles to that in the next region, as shown by arrows 1510 and 1520. With this arrangement, the first liquid crystal optical element 100-1 and the second liquid crystal optical element 100-2 shown in FIG. 9 can be replaced by a single liquid crystal optical element.

Preferably, each microscopic region shown in FIG. 15(b) is not larger than 200 nm square. When the size is not larger than one half of the shortest wavelength of the visible wavelength region (400 nm to 700 nm), the orientation distribution of the liquid crystal works isotropically for any visible light, allowing the change in the refractive index of the liquid crystal to exert its influence on it.

In FIG. 15(b), the rubbing directions are only set in two directions 1510 and 1520 at right angles to each other, but the rubbing direction for each microscopic region may be randomly set. Further, the rubbing direction for each microscopic region may be set in one of a plurality of directions including at least the two directions oriented at right angles to each other.

Figure 16:
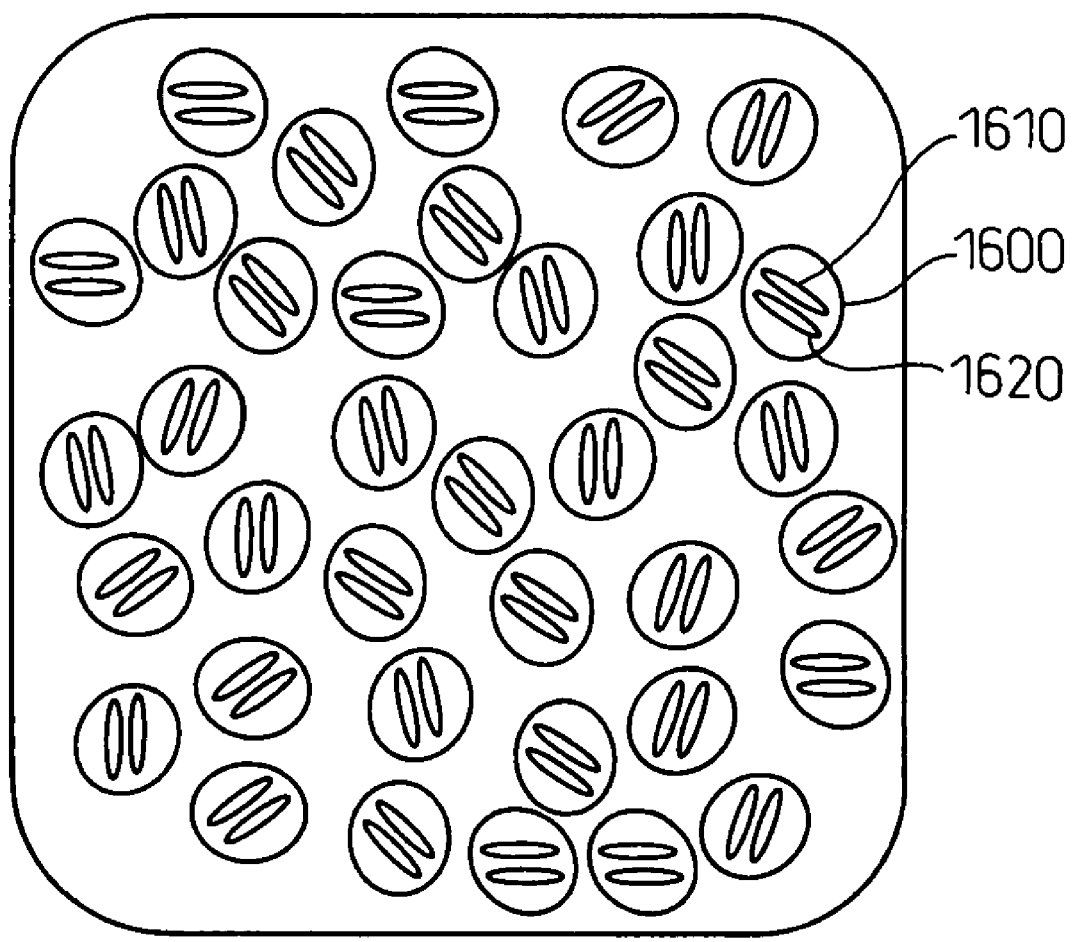
FIG. 16 is a diagram showing still another example of the liquid crystal that can be used in the liquid crystal optical element 100 of the present invention.
Figure 17A:
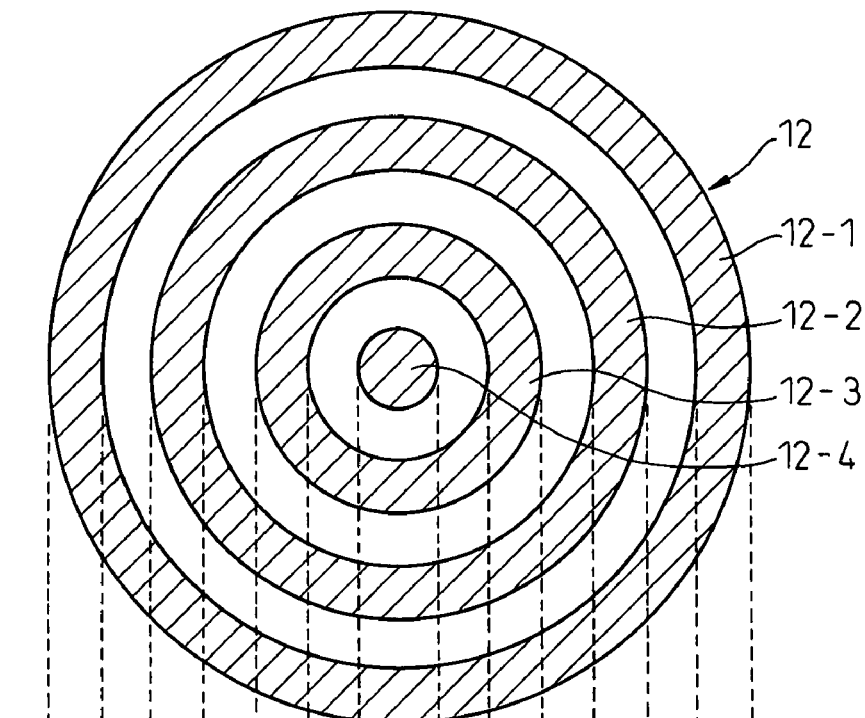
FIG. 17(a) is a diagram showing an electrode pattern according to the prior art.
Figure 17B:
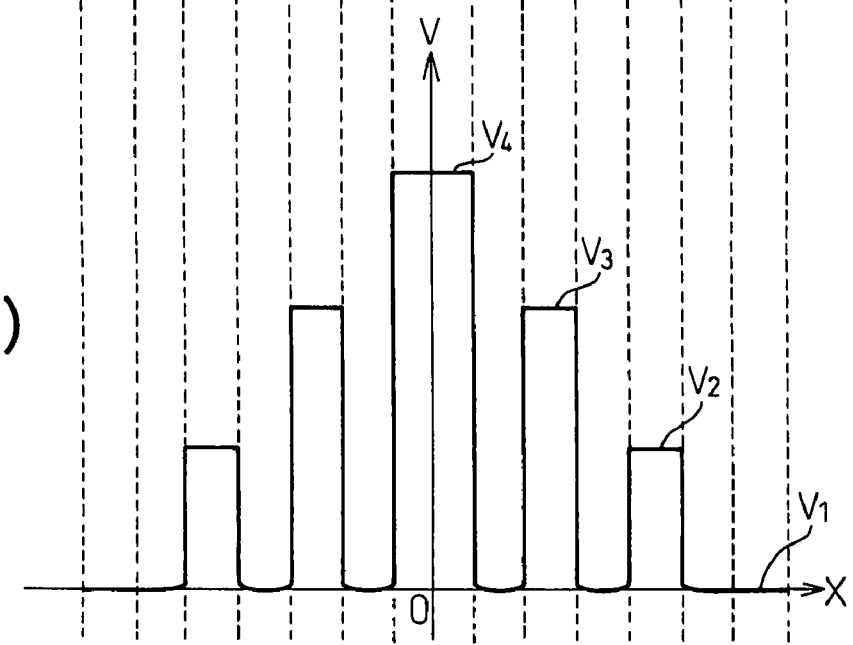
FIG. 17(b) is a diagram showing the voltages applied to FIG. 17(a).
Figure 18A:
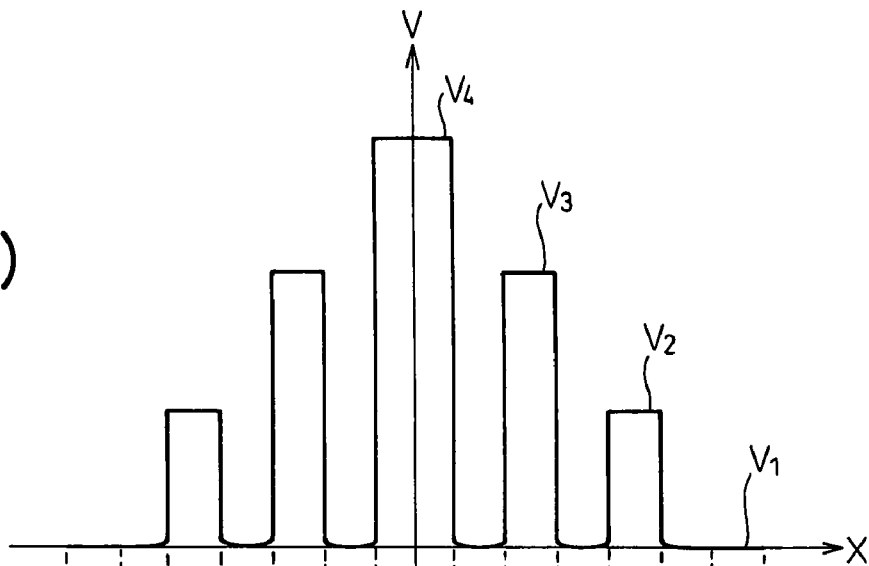
FIG. 18(a) is a diagram showing the applied voltages shown in FIG. 17(b)
Figure 18B:
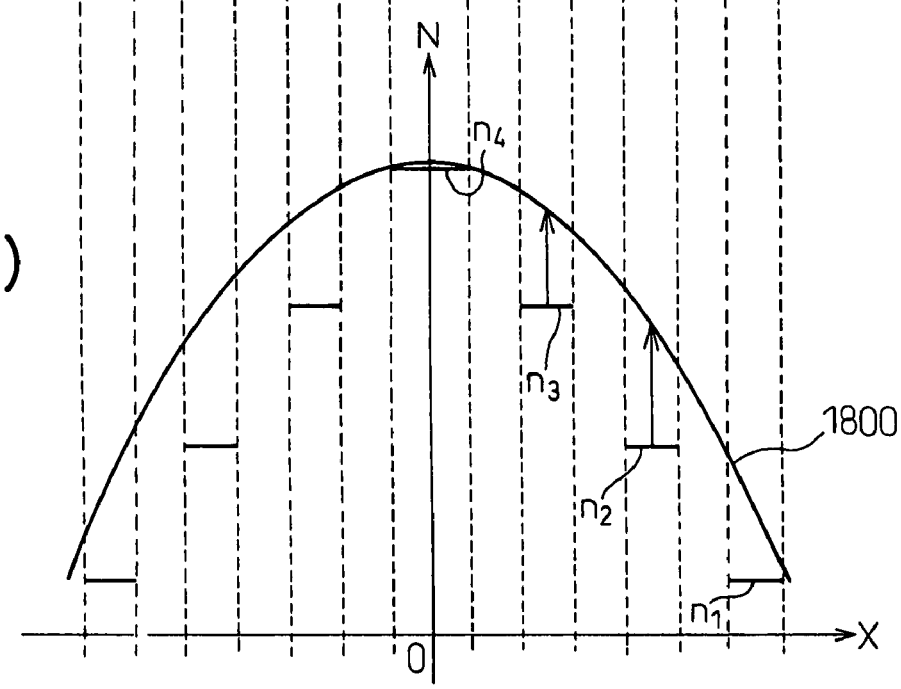
FIG. 18(b) is a diagram showing an effective refractive index pattern corresponding to FIG. 17(a).

FIG. 16 is a diagram showing still another example of the liquid crystal that can be used in the liquid crystal optical element 100 of the present invention.

The liquid crystal shown in FIG. 16 is called a PD (Polymer Dispersed) liquid crystal in which microcapsules 1600 containing liquid crystal molecules are dispersed through a binder. Since liquid crystal molecules are contained within the microcapsules, one of the features of this type of liquid crystal is that interaction does not occur between liquid crystal molecules, and the microcapsules are thus oriented in random directions. The long axes of the liquid crystal molecules within each microcapsules are aligned in the same direction. In the liquid crystal layer as a whole, the long axes of the liquid crystal molecules are oriented in random directions as shown in FIG. 16. In the example of FIG. 16, the diameter of each microcapsule 1600 is set to about 200 nm.

Accordingly, when the PD liquid crystal shown in FIG. 16 is used as the liquid crystal of the liquid crystal optical element 100, an optical element that is free from the previously described polarization dependence can be produced.

Further, when the diameter of each microcapsule is set to be not larger than 200 nm, but not smaller than 2 nm, since the size of the microcapsule is not larger than one half of the shortest wavelength of the visible wavelength region (400 nm to 700 nm), the change in the refractive index of the liquid crystal can exert its influence on any visible light. Furthermore, the liquid crystal optical element 100 constructed as shown in FIG. 15(b) or 16 is not only difficult to exhibit polarization dependence, but has the effect of reducing the viewing angle dependence inherent in liquid crystals.

The reference effective refractive index No of the PD liquid crystal shown in FIG. 16 is equal to the average value of the refractive index Ne in the long axis direction of the liquid crystal molecules and the refractive index No in the short axis direction. Accordingly, when using the PD liquid crystal instead of the liquid crystal 106, the liquid crystal optical element 100 must be designed based on this reference effective refractive index No.

What is claimed is:

1. A liquid crystal optical element as a variable focus gradient-index lens for a light beam incident from a light source, comprising:
    a first planar substrate;
    a second planar substrate;
    a liquid crystal provided between said first and second planar substrates;
    an electrode pattern formed on one of said first and second planar substrates and having a plurality of regions each for varying an effective refractive index for a light beam; and
    a counter electrode, formed on the other one of said first and second planar substrates, for applying a voltage with respect to said electrode pattern, wherein
    the effective refractive index for a light beam varies with the square of distance from the center of said liquid crystal optical element along a radial direction across said liquid crystal optical element when the voltage is applied between said electrode pattern and said counter electrode, and
    the amount by which each of said plurality of regions causes the effective refractive index to change is set substantially constant across said plurality of regions, or potential difference between each of said plurality of regions is set substantially constant across said plurality of regions.

2. The liquid crystal optical element according to claim 1, wherein the effective refractive index N for said light beam varies with distance x from the center of said electrode pattern so as to substantially satisfy a relationship defined by the following equation (1) when the voltage is applied between said electrode pattern and said counter electrode, $$N = N_0 - aX^2 - (bX^4 - cX^6 - dX^8 - \ldots) \qquad (1)$$

where $N_0$ is a reference effective refractive index of said liquid crystal, a is a nonzero constant, and b, c, and d are constants.

3. The liquid crystal optical element according to claim 2, wherein regions where the effective refractive index N for said light beam varies with the distance x from the center of said electrode pattern so as to substantially satisfy the relationship defined by said equation (1) constitute a portion of said electrode pattern.

4. The liquid crystal optical element according to claim 3, wherein only a center portion of said electrode pattern is configured so that the effective refractive index N for said light beam varies with the distance x from the center of said electrode pattern so as to substantially satisfy the relationship defined by said equation (1).

5. The liquid crystal optical element according to claim 2, further comprising selective voltage applying means for selectively applying a voltage only to regions formed in a peripheral portion of said electrode pattern so as not to vary the effective refractive index therein.

6. The liquid crystal optical element according to claim 2, further comprising resistors, respectively connected between said plurality of regions, for applying resistively divided voltages to said plurality of regions.

7. The liquid crystal optical element according to claim 2, further comprising voltage applying means for applying voltages of different values between said plurality of regions.

8. The liquid crystal optical element according to claim 1, wherein the amount by which each of said plurality of regions causes the effective refractive index to change is set substantially constant across said plurality of regions, and potential difference between each of said plurality of regions is set substantially constant across said plurality of regions.

9. The liquid crystal optical element according to claim 2, wherein said plurality of regions are arranged so that the effective refractive index for said light beam can be set at the finer level in a center portion of said electrode pattern than in a peripheral portion thereof.

10. The liquid crystal optical element according to claim 2, wherein said liquid crystal is arranged in a liquid crystal layer so that long axes of liquid crystal molecules partially align in a plurality of directions including at least two directions oriented at right angles to each other.

11. The liquid crystal optical element according to claim 10, wherein said liquid crystal is arranged in said liquid crystal layer so that the long axes of said liquid crystal molecules are partially randomly oriented.

12. The liquid crystal optical element according to claim 10, wherein said liquid crystal is arranged in said liquid crystal in the form of capsules.

13. A method for manufacturing a liquid crystal optical element as a variable focus gradient-index lens for incident light, said liquid crystal optical element including a first planar substrate, a second planar substrate, a liquid crystal provided between said first and second planar substrates, an electrode pattern formed on one of said first and second planar substrates and having a plurality of regions each for varying an effective refractive index for incident light by a respectively different degree, and a counter electrode, formed on the other one of said first and second planar substrates, for applying a voltage with respect to said electrode pattern, wherein the effective refractive index N for said light beam varies with distance x from the center of said electrode pattern so as to substantially satisfy a relationship defined by following equation (1) when the voltage is applied between said electrode pattern and said counter electrode, $$N = N_0 - aX^2 - (bX^4 - cX^6 - dX^8 - \ldots) \qquad (1)$$

where $N_0$ is a reference effective refractive index of said liquid crystal, a is a nonzero constant, and b, c, and d are constants, and the amount by which each of said plurality of regions causes the effective refractive index to change is set substantially constant across said plurality of regions, or potential difference between each of said plurality of regions is set substantially constant across said plurality of regions, the method comprising the steps of:

determining a desired variable focus gradient-index lens characteristic that shows refractive index values corresponding to pupil coordinates;

dividing a section between a maximum effective refractive index and a minimum effective refractive index that said lens characteristic shows, by the number of said plurality of regions;

determining the pupil coordinates of points at which said divided effective refractive indices intersect said lens characteristic; and setting said plurality of regions so that the pupil coordinates of said intersection points each represent a center of a region-to-region gap.

* * * * *